(12) United States Patent
Hsu et al.

(10) Patent No.: US 8,983,995 B2
(45) Date of Patent: Mar. 17, 2015

(54) INTERACTIVE SEMANTIC QUERY SUGGESTION FOR CONTENT SEARCH

(75) Inventors: Bo-June Hsu, Woodinville, WA (US);
Kuansan Wang, Bellevue, WA (US);
Yu-Ting Kuo, Sammamish, WA (US);
Chao-Chia Liu, Sammamish, WA (US);
Heung-Yeung Shum, Medina, WA (US);
Cornelia Carapcea, Seattle, WA (US);
Yusuf Furkan Fidan, Bellevue, WA (US); Lawrence William Colagiovanni, Issaquah, WA (US); Arun Sacheti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 13/166,969

(22) Filed: Jun. 23, 2011

(65) Prior Publication Data
US 2012/0265779 A1  Oct. 18, 2012

Related U.S. Application Data

(60) Provisional application No. 61/476,154, filed on Apr. 15, 2011.

(51) Int. Cl.
*G06F 17/30* (2006.01)
(52) U.S. Cl.
CPC ...... *G06F 17/3064* (2013.01); *G06F 17/30654* (2013.01); *G06F 17/30731* (2013.01)
USPC .... 707/767; 707/771; 707/780; 707/E17.014; 707/E17.074; 705/26.62; 705/26.7; 705/347

(58) Field of Classification Search
CPC .......... G06F 17/3064; G06F 17/30654; G06F 17/30731; G06F 17/30985; G06F 17/2785; G06F 17/30672; G06F 17/30707; G06F 17/30595; G06F 17/3061; G06F 17/30864

USPC ........ 707/780, 771, 740, 748, 708, 737, 710, 707/761, 765, 759, 721, 722, 706, 713, 728, 707/767, 769, 802, 805, E17.09, E17.014, 707/E17.079, E17.108, E17.137, E17.141, 707/E17.074, E17.03, E17.016, 705, 736, 707/766, 999.005, E17.066, E17.039, 707/E17.075, 999.003; 715/961; 705/26.62, 705/26.7, 347

See application file for complete search history.

(56) References Cited

U.S. PATENT DOCUMENTS

| | | | |
|---|---|---|---|
| 6,408,294 B1 | 6/2002 | Getchius et al. | |
| 6,460,029 B1 | 10/2002 | Fries et al. | |

(Continued)

OTHER PUBLICATIONS

Vera Hollink,Theodora Tsikrika and Arjen de Vries—"The Semantics of Query Modification"—Proceeding RIAO '10 Adaptivity, Personalization and Fusion of Heterogeneous Information—ACM—2010—Le Centre De Hautes Etudes Internationales D'Informatique Documentaire Paris, France,—pp. 176-181.*

(Continued)

*Primary Examiner* — Anh Ly
(74) *Attorney, Agent, or Firm* — Dave Ream; Doug Barker; Micky Minhas

(57) ABSTRACT

Systems, methods and computer-storage media are provided for identifying query formulation suggestions in response to receiving a search query. A portion of a search query is received. Query formulation suggestions are identified by semantically analyzing the search query. The query formulation suggestions are used to further formulate the received search query. The query formulation suggestions include semantic-pattern-based query suggestions that are derived from semantic query patterns, one or more entities, and information associated with these entities. The query formulation suggestions are transmitted for presentation.

35 Claims, 25 Drawing Sheets

(56) References Cited

U.S. PATENT DOCUMENTS

| | | | |
|---|---|---|---|
| 6,484,161 B1 | 11/2002 | Chipalkatti et al. | |
| 6,493,721 B1 | 12/2002 | Getchius et al. | |
| 6,647,383 B1 | 11/2003 | August et al. | |
| 6,826,559 B1 | 11/2004 | Ponte | |
| 7,013,264 B2 | 3/2006 | Dolan et al. | |
| 7,092,936 B1* | 8/2006 | Alonso et al. | 707/737 |
| 7,103,264 B2 | 9/2006 | Kobayashi | |
| 7,197,494 B2 | 3/2007 | Wang et al. | |
| 7,200,559 B2 | 4/2007 | Wang | |
| 7,240,049 B2 | 7/2007 | Kapur | |
| 7,328,211 B2* | 2/2008 | Bordner et al. | 707/4 |
| 7,430,505 B1 | 9/2008 | Horvitz et al. | |
| 7,461,059 B2 | 12/2008 | Richardson et al. | |
| 7,502,730 B2 | 3/2009 | Wang | |
| 7,519,529 B1* | 4/2009 | Horvitz | 704/7 |
| 7,558,841 B2 | 7/2009 | Taboada et al. | |
| 7,624,075 B2 | 11/2009 | Lucco et al. | |
| 7,676,460 B2 | 3/2010 | Morgan | |
| 7,680,778 B2 | 3/2010 | Middha et al. | |
| 7,725,485 B1 | 5/2010 | Sahami et al. | |
| 7,756,855 B2 | 7/2010 | Ismalon | |
| 7,765,178 B1 | 7/2010 | Roizen et al. | |
| 7,774,193 B2 | 8/2010 | Gao et al. | |
| 7,809,568 B2 | 10/2010 | Acero et al. | |
| 7,818,279 B2 | 10/2010 | Liu et al. | |
| 7,870,117 B1 | 1/2011 | Rennison | |
| 7,912,705 B2* | 3/2011 | Wasson et al. | 707/705 |
| 8,019,748 B1 | 9/2011 | Wu et al. | |
| 8,140,556 B2* | 3/2012 | Rao et al. | 707/759 |
| 8,224,829 B2 | 7/2012 | Pauly | |
| 8,244,726 B1 | 8/2012 | Matesso et al. | |
| 8,265,797 B2* | 9/2012 | Nickerson et al. | 715/961 |
| 8,335,778 B2* | 12/2012 | Ghosh et al. | 707/708 |
| 8,489,445 B1* | 7/2013 | Berg et al. | 705/7.34 |
| 2002/0029232 A1 | 3/2002 | Bobrow et al. | 707/517 |
| 2002/0143860 A1* | 10/2002 | Catan | 709/203 |
| 2003/0115192 A1 | 6/2003 | Kil et al. | |
| 2003/0220917 A1* | 11/2003 | Copperman et al. | 707/3 |
| 2004/0225643 A1* | 11/2004 | Alpha et al. | 707/3 |
| 2004/0243555 A1 | 12/2004 | Bolsius | |
| 2004/0249808 A1* | 12/2004 | Azzam et al. | 707/4 |
| 2005/0071328 A1 | 3/2005 | Lawrence | |
| 2005/0080795 A1 | 4/2005 | Kapur et al. | |
| 2005/0108001 A1* | 5/2005 | Aarskog | 704/10 |
| 2005/0137849 A1 | 6/2005 | Parkinson | |
| 2005/0234881 A1 | 10/2005 | Burago | |
| 2006/0106769 A1* | 5/2006 | Gibbs | 707/3 |
| 2006/0111896 A1 | 5/2006 | Menezes et al. | |
| 2006/0117003 A1 | 6/2006 | Ortega et al. | |
| 2006/0167842 A1 | 7/2006 | Watson | |
| 2006/0206454 A1* | 9/2006 | Forstall et al. | 707/3 |
| 2006/0253427 A1 | 11/2006 | Wu et al. | |
| 2007/0050352 A1 | 3/2007 | Kim | |
| 2007/0061335 A1* | 3/2007 | Ramer et al. | 707/10 |
| 2007/0100653 A1* | 5/2007 | Ramer et al. | 705/1 |
| 2007/0106509 A1 | 5/2007 | Acero et al. | |
| 2007/0192143 A1 | 8/2007 | Krishnan et al. | |
| 2007/0192318 A1* | 8/2007 | Ramer et al. | 707/7 |
| 2007/0219966 A1 | 9/2007 | Baylis et al. | |
| 2008/0104045 A1 | 5/2008 | Cohen et al. | |
| 2008/0114760 A1 | 5/2008 | Indeck et al. | |
| 2008/0140696 A1 | 6/2008 | Mathuria | |
| 2008/0208567 A1* | 8/2008 | Brockett et al. | 704/9 |
| 2008/0215557 A1* | 9/2008 | Ramer et al. | 707/4 |
| 2008/0256061 A1 | 10/2008 | Chang et al. | |
| 2009/0006384 A1* | 1/2009 | Tunkelang et al. | 707/5 |
| 2009/0006385 A1* | 1/2009 | Tunkelang et al. | 707/5 |
| 2009/0006386 A1* | 1/2009 | Tunkelang et al. | 707/5 |
| 2009/0006387 A1* | 1/2009 | Tunkelang et al. | 707/5 |
| 2009/0012778 A1 | 1/2009 | Feng et al. | |
| 2009/0077047 A1* | 3/2009 | Cooper et al. | 707/4 |
| 2009/0082037 A1 | 3/2009 | Ju et al. | |
| 2009/0083232 A1 | 3/2009 | Ives et al. | |
| 2009/0089044 A1* | 4/2009 | Cooper et al. | 704/9 |
| 2009/0094145 A1 | 4/2009 | Kim et al. | |
| 2009/0106224 A1* | 4/2009 | Roulland et al. | 707/5 |
| 2009/0119289 A1 | 5/2009 | Gibbs et al. | |
| 2009/0132500 A1* | 5/2009 | Jones et al. | 707/3 |
| 2009/0144262 A1* | 6/2009 | White et al. | 707/5 |
| 2009/0164895 A1 | 6/2009 | Baeza-Yates et al. | |
| 2009/0171929 A1* | 7/2009 | Jing et al. | 707/5 |
| 2009/0192966 A1 | 7/2009 | Horvitz et al. | |
| 2009/0254971 A1* | 10/2009 | Herz et al. | 726/1 |
| 2009/0271177 A1 | 10/2009 | Menezes et al. | |
| 2009/0276419 A1* | 11/2009 | Jones et al. | 707/5 |
| 2009/0287690 A1* | 11/2009 | Bennett | 707/5 |
| 2009/0313237 A1 | 12/2009 | Agrawal et al. | |
| 2009/0327270 A1* | 12/2009 | Teevan et al. | 707/5 |
| 2010/0005087 A1* | 1/2010 | Basco et al. | 707/5 |
| 2010/0010977 A1 | 1/2010 | Choi et al. | |
| 2010/0057687 A1 | 3/2010 | Shen et al. | |
| 2010/0082658 A1 | 4/2010 | Athsani et al. | |
| 2010/0114908 A1 | 5/2010 | Chand et al. | |
| 2010/0121839 A1 | 5/2010 | Meyer et al. | |
| 2010/0131902 A1 | 5/2010 | Teran et al. | |
| 2010/0185643 A1* | 7/2010 | Rao et al. | 707/759 |
| 2010/0191740 A1* | 7/2010 | Lu et al. | 707/748 |
| 2010/0205180 A1* | 8/2010 | Cooper et al. | 707/740 |
| 2010/0205202 A1 | 8/2010 | Yang et al. | |
| 2010/0223275 A1 | 9/2010 | Foulger et al. | |
| 2010/0257193 A1 | 10/2010 | Krupka et al. | |
| 2010/0268702 A1 | 10/2010 | Wissner et al. | |
| 2010/0332493 A1 | 12/2010 | Haas et al. | |
| 2011/0035397 A1 | 2/2011 | Joshi et al. | |
| 2011/0035403 A1* | 2/2011 | Ismalon | 707/769 |
| 2011/0071827 A1 | 3/2011 | Lee et al. | |
| 2011/0072033 A1 | 3/2011 | White et al. | |
| 2011/0078243 A1* | 3/2011 | Carpenter et al. | 709/204 |
| 2011/0083167 A1* | 4/2011 | Carpenter et al. | 726/4 |
| 2011/0093452 A1* | 4/2011 | Jain | 707/723 |
| 2011/0184945 A1* | 7/2011 | Das et al. | 707/724 |
| 2011/0202520 A1 | 8/2011 | Teran et al. | |
| 2011/0231428 A1* | 9/2011 | Kuramura | 707/769 |
| 2011/0276432 A1* | 11/2011 | Bolivar et al. | 707/E17.014 |
| 2012/0166426 A1* | 6/2012 | Milward et al. | 707/722 |
| 2012/0173174 A1* | 7/2012 | Gaarder | 702/58 |
| 2012/0265779 A1 | 10/2012 | Hsu et al. | |
| 2012/0265784 A1 | 10/2012 | Hsu et al. | |
| 2012/0265787 A1 | 10/2012 | Hsu et al. | |
| 2012/0323905 A1* | 12/2012 | Qiao | 707/723 |
| 2013/0041921 A1* | 2/2013 | Cooper et al. | 707/780 |
| 2013/0103696 A1 | 4/2013 | Wu et al. | |
| 2013/0173614 A1* | 7/2013 | Ismalon | 707/733 |
| 2013/0290342 A1* | 10/2013 | Cooper et al. | 707/740 |
| 2014/0012868 A1* | 1/2014 | Nakazaki | 707/758 |

OTHER PUBLICATIONS

Edgar Meij, MarcBron, Laura Hollink, Bouke Huurnink, and Maarten de Rijke—"Learning Semantic Query Suggestions"—Semantic Web—ISWC 2009—Lecture Notes in Computer Science, 2009, vol. 5823/2009—pp. 424-440.*

Gábor Nagypál —"Improving Information Retrieval Effectiveness by Using Domain Knowledge Stored in Ontologies"—On the Move to Meaningful Internet Systems 2005: OTM 2005 Workshops Lecture Notes in Computer ScienceVolume 3762, 2005, pp. 780-789.*

Epaminondas Kapetanios, Vijayan Sugumaran, and Diana Tanase— "Multi-lingual Web Querying: A Parametric Linguistics Based Approach"—Natural Language Processing and Information Systems Lecture Notes in Computer ScienceVolume 3999, Jun. 2, 2006, pp. 94-105.*

Strohmaier, "Intentional Query Suggestion: Making User Goals More Explicit During Search," Feb. 9, 2009, In Proceedings of the 2009 Workshop on Web Search Click Data, 7 pages, Barcelona, Spain.

Belkin, "Iterative Exploration, Design and Evaluation of Support for Query Reformulation in Interactive Information Retrieval," In Journal of Information Processing and Management: an International Journal—Special issue on interactivity at the text retrieval conference, vol. 37 Issue 3, May 2001, 32 pages.

MA, "Learning Latent Semantic Relations from Clickthrough Data for Query Suggestion," In Proceedings of the 17th ACM conference

(56) References Cited

OTHER PUBLICATIONS on Information and knowledge management. Oct. 26-30, 2008, 10 pages, Napa Valley, CA.
Baer, "A Semantics Based Interactive Query Formulation Technique," In Proceedings of user Interfaces to Data Intensive Systems, 2001, UIDIS 2001. Proceedings. Second Internataional Workshop on,May 31, 2001, 7 pages.
Hollink, "The Semantics of Query Modification," In Proceeding RIAO '10 Adaptivity, Personalization and Fusion of Heterogeneous Information, Apr. 30, 2010, 6 pages, Paris, France.
Dongilli, "Semantics Driven Support for Query Formulation," 2004, 10 pp., Italy, available at http://citeseerx.ist.psu.edu/viewdoc/download?doi=10.1.1.144.7182&rep=rep1&type=pdf#page=128.
Reynolds, "A Query Refinement Model for Exploratory Semantic Search," Copyright 2009, Hewlett-Packard Development Company, In Technical Report HPL-2009-167, HP Laboratories, Jul. 21, 2009, 17 pages.
Non-Final Office Action mailed Oct. 11, 2012 in U.S. Appl. No. 13/167,007, 140 pages.
Non-Final Office Action mailed Jul. 9, 2012 in U.S. Appl. No. 13/172,561, 16 pages.
Non-Final Office Action mailed Oct. 11, 2012 in U.S. Appl. No. 13/167,007, 26 pages.
Li, et al., "XQSuggest: An Interactive XML Keyword Search System", In proceedings of the 20th International Conference on Database and Expert Systems Applications, Aug. 31-Sep. 4, 2009, 8 pages.
Notification of Transmittal of the International Search Report and the Written Opinion of the Internationak Searching Authority, or the Declaration in PCT/US2012/033718, mailed Sep. 27, 2012, 9 pages.
International Search Report mailed Sep. 21, 2012 in PCT/US2012/033717, 9 pages.
Huang, et al, "Contextual Knowledge Representation, Retrieval and Interpretation in Multimedia e-Learning", In Information Reuse and Integration, Oct. 27-29, 2003, 8 pages.
Non-Final Office Action dated May 9, 2013 in U.S. Appl. No. 13/167,007, 37 pages.
Final Office Action dated Oct. 23, 2013 in U.S. Appl. No. 13/167,007, 35 pages.
Non-Final Office Action dated Apr. 16, 2014 in U.S. Appl. No. 13/172,561, 17 pages.
Notice of Allowance dated Apr. 9, 2014 in U.S. Appl. No. 13/167,007, 17 pages.
Denisa Popescu—Thesaurus-aided search—14th ASIS SIG/CR Classification Research Workshop—Oct. 18, 2003 (pp. 71-85:1-15)—journals.lib.washington.edu.
Zhong Su, Qiang Yang, YeLu, and Honjiang Zhang—"WhatNext: a prediction system for Web requests using n-gram sequence model"—Web Information Systems Engineering, 2000. Proceedings of the First International Conference on Date Jun. 19-21, 2000 vol. 1, (pp. 214-221).

* cited by examiner

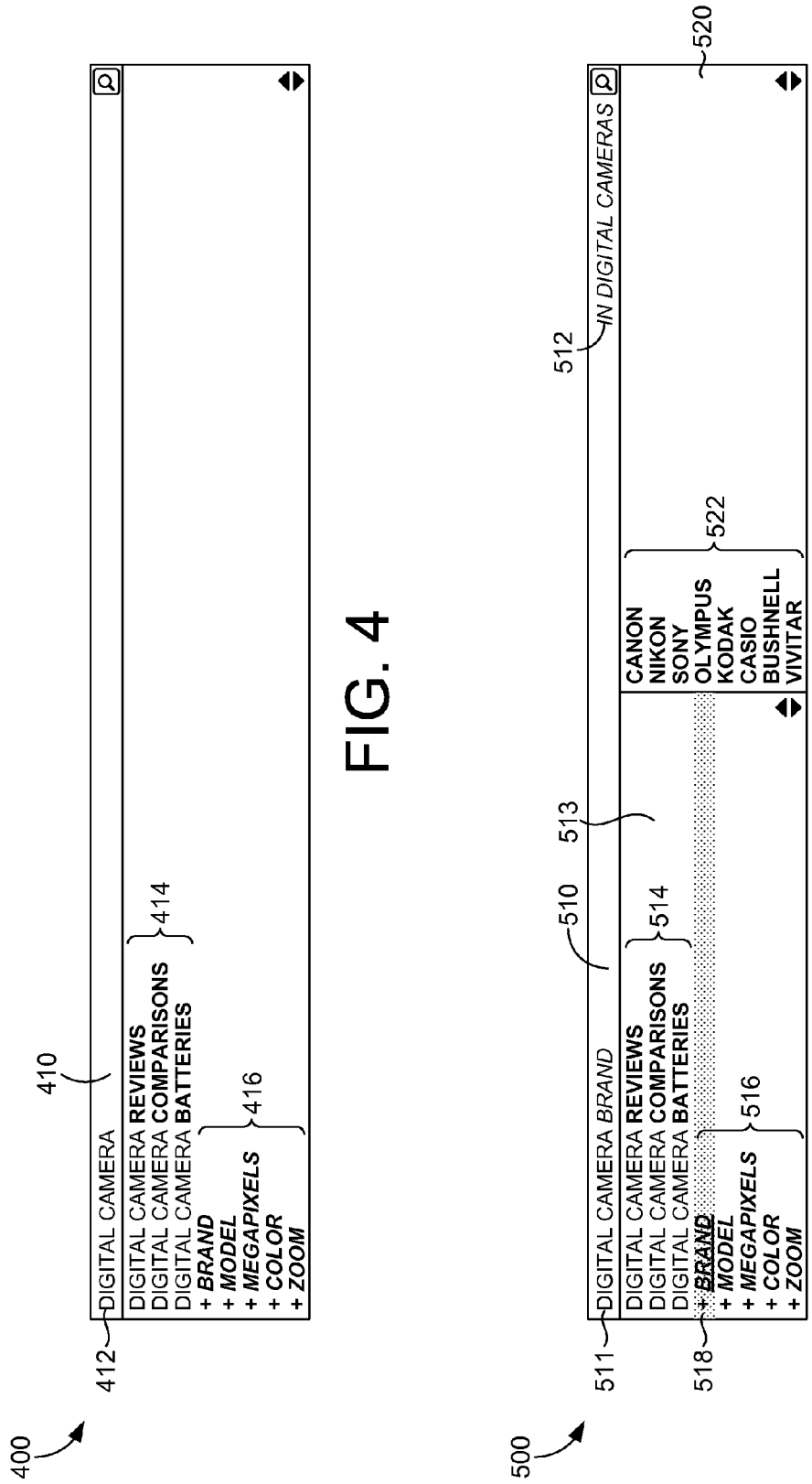

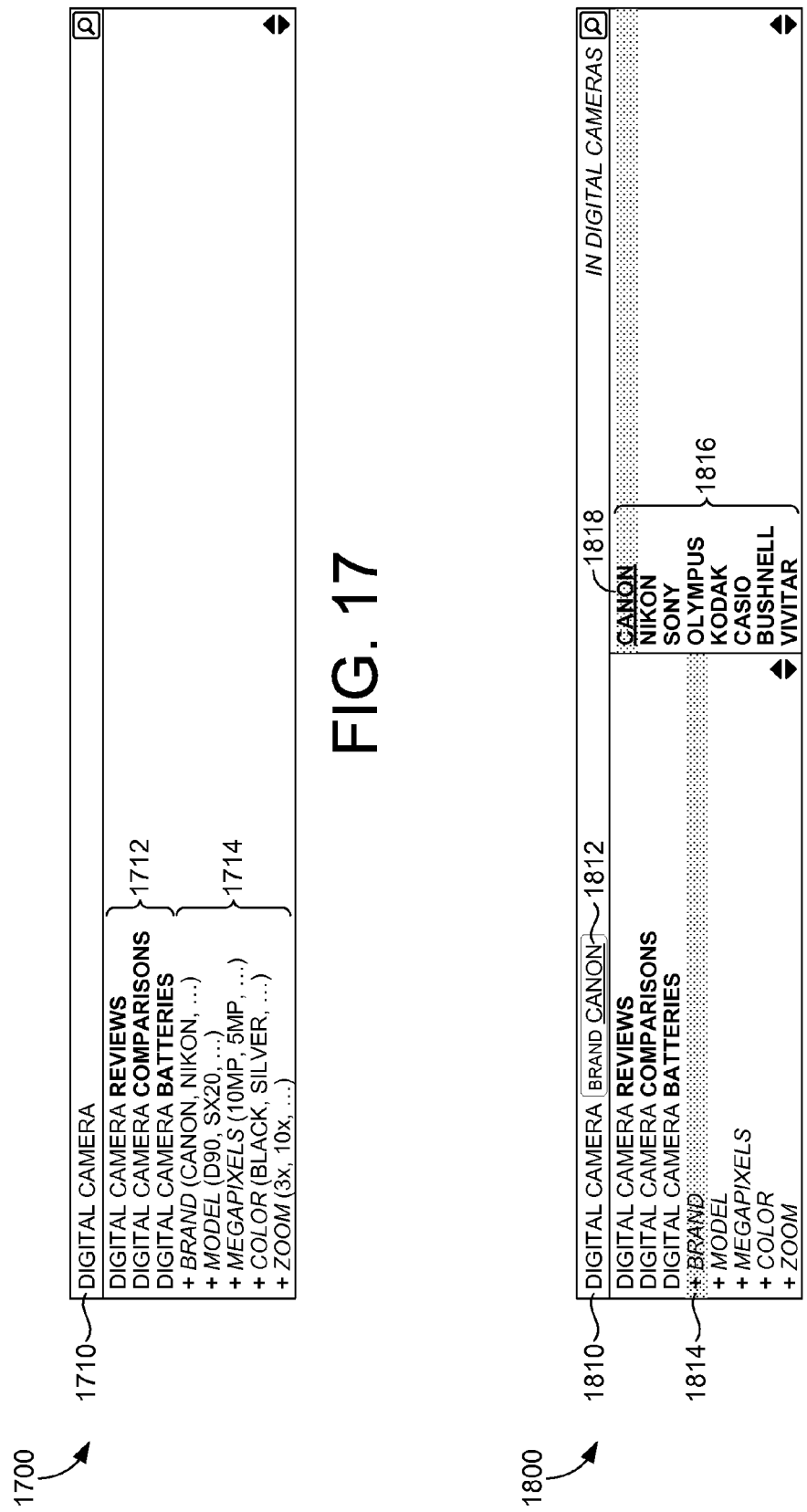

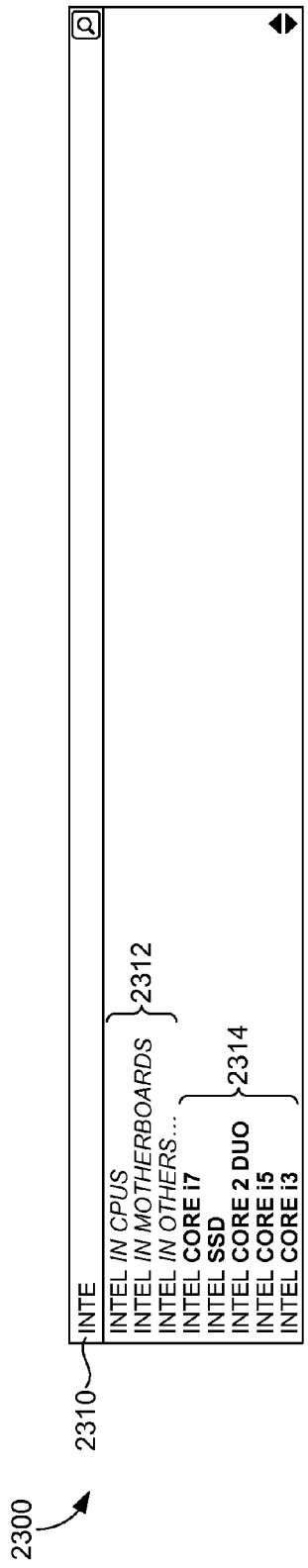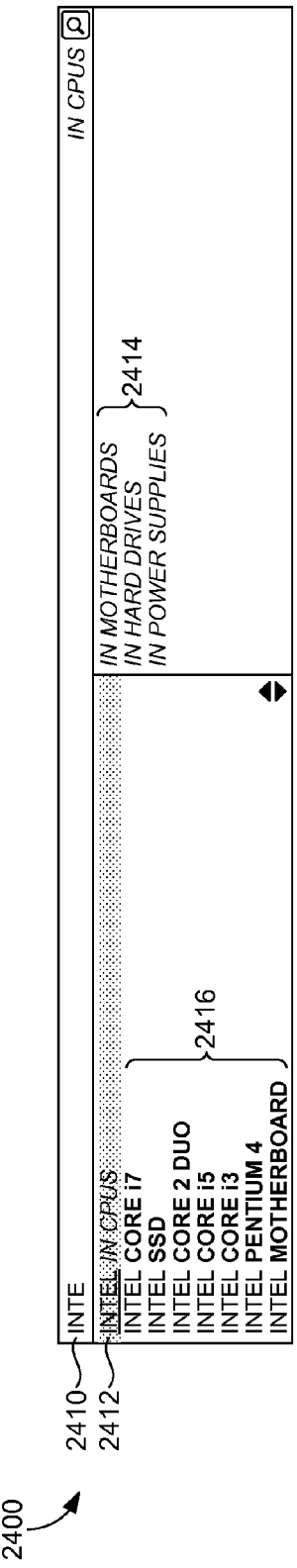

2512 — INTE
INTEL IN CPUS — 2514
INTEL CORE i7
INTEL SSD
INTEL CORE 2 DUO
INTEL CORE i5
INTEL CORE i3
INTEL PENTIUM 4
INTEL MOTHERBOARD

2610 — GOLD WATCH
2612 — GOLD WATCH MATERIAL GOLD
GOLD WATCHES FOR WOMEN
GOLD WATCH BANDS
GOLD WATCH AND BRACELET SET
GOLD WATCH MOVADO
GOLD WATCH GOLD FACE
GOLD WATCH WOMAN
GOLD WATCHES FOR SALE

INTERACTIVE SEMANTIC QUERY SUGGESTION FOR CONTENT SEARCH

CROSS-REFERENCE TO RELATED APPLICATIONS

This application claims the benefit of Provisional Patent Application No. 61/476,154, filed on Apr. 15, 2011, and entitled "Interactive Semantic Query Suggestion for Content Search." This application is further related by subject matter to U.S. patent application Ser. No. 13/167,007, entitled "Interactive Semantic Query Suggestion for Content Search," filed on even date herewith. Both Provisional Patent Application No. 61/476,154 and U.S. patent application Ser. No. 13/167,007 are hereby incorporated by reference as is set forth in their entirety herein.

BACKGROUND

Typically, search engines provide the user with an empty search box into which a user may input a search query and interact with the search system. For various reasons, search queries provided by users do not always accurately reflect the user's actual intent. While some search engines are capable of assisting users in completing search queries, e.g., by providing query completion suggestions, such query completion suggestions are typically generated based solely upon search queries that have been submitted in the past, such as the most popular search queries that begin with the alphanumeric characters with which the user begins their query. As such, if a user begins entering the search query "wate," query completion suggestions may include "water for elephants," "water fountain," "water cycle," "watergate," etc. However, in many cases, the suggestions provided to the user may not reflect what the user is actually intending to search for as they are based solely on prior queries input by a collective group of users, and do not include unseen queries or queries that are seldom entered, but that may be what the user is intending to search for. Likewise, users have little, if any, knowledge about what information the search system may have available with regard to answering the task they have in mind. As such, the search system may not return satisfactory results to the user due, at least in part, to the system's failure to understand or disambiguate the user's actual intent, and to match the user's intent with useful information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to semantically analyzing at least a portion of a search query that is entered by a user to provide the user with query formulation suggestions based on identified entities. Entities may refer to a particular item (e.g., product, location, company, person, organization, etc.) having known associated information. This information may include, for example, categories, attributes, and attribute values. Entities and their respective associated information may be stored in an entity store. A system in accordance with embodiments of the present invention assists users in query formulation and intent disambiguation in an attempt to discover the true intent of an input, or partially input, search query. Embodiments of the invention may be scaled to tail and never-seen queries and can provide better user-intent signals to the system. Such signals lead to selection and presentation of better and more relevant search results.

BRIEF DESCRIPTION OF THE DRAWINGS

The present invention is described in detail below with reference to the attached drawing figures, wherein:

FIGS. 3-26 depict exemplary screen displays of graphical user interfaces, in accordance with various embodiments of the present invention;

DETAILED DESCRIPTION

Figure 1:
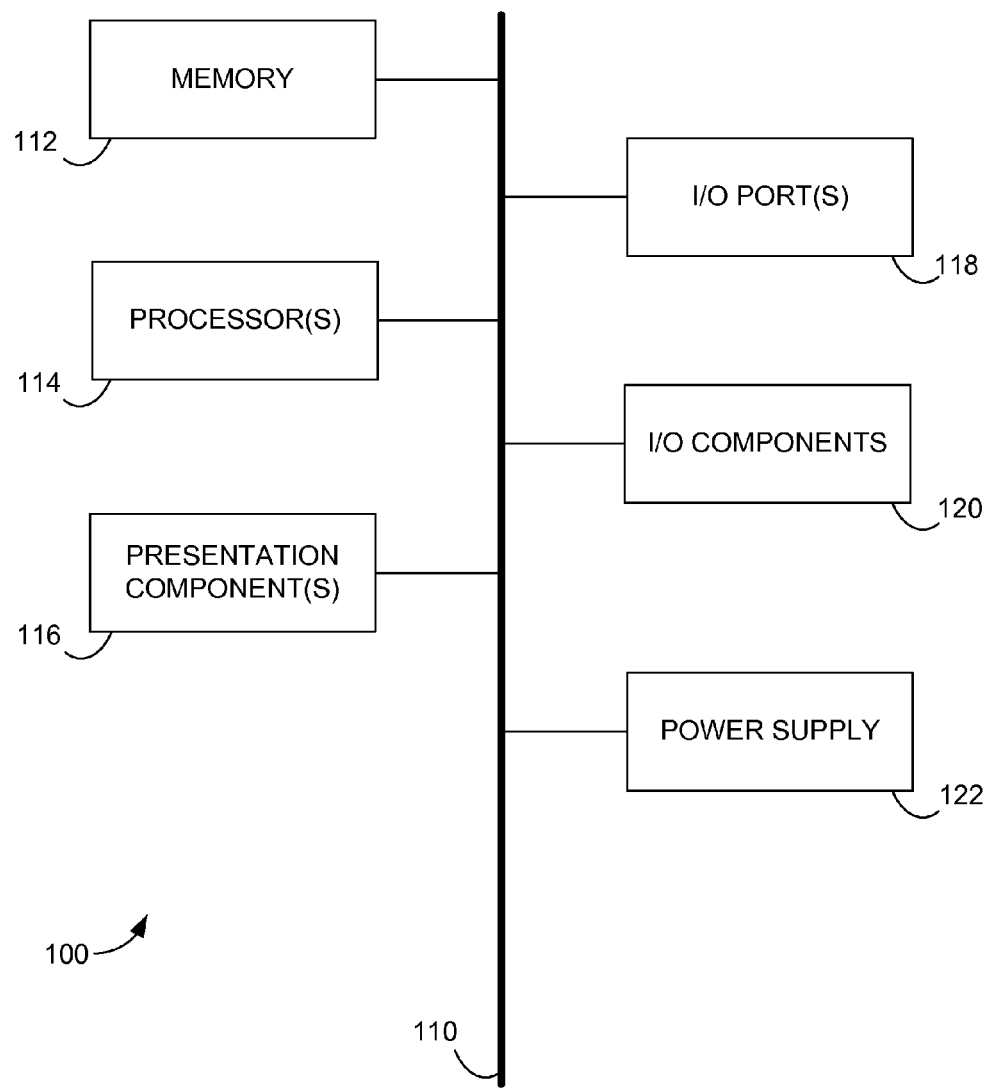
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for systems, methods and computer-storage media having computer-usable instructions embodied thereon, for building, linking, and exposing semantic knowledge of a search system or systems (e.g., query logs, facets, relationships of entities from structured and unstructured data, contextual signals, and the like) to assist users in query formulation and intent disambiguation. Embodiments of the invention may expose never-seen queries and provide better user-intent signals to the system. Such signals lead to selection and presentation of better and more relevant search results.

Accordingly, in one embodiment, the present invention is directed to a method performed by a computing device having a processor and a memory for identifying query formulation suggestions in response to receiving a search query. The method includes receiving at least a portion of the search query and identifying one or more query formulation suggestions by semantically analyzing the at least the portion of the search query. The one or more query formulation suggestions comprise semantic-pattern-based query suggestions that are derived from semantic query patterns and at least one of one or more entities or information associated with the one or more entities. The method further includes transmitting the one or more query formulation suggestions for presentation.

In another embodiment, the invention is directed to a system comprising a processor and a memory for identifying query formulation suggestions in response to receiving a search query. The system includes a receiving component, a semantic analyzing component and a transmitting component. The receiving component receives at least a portion of a search query. The semantic analyzing component semantically analyzes the at least the portion of the search query to identify one or more query formulation suggestions that comprise semantic-pattern-based query suggestions that are derived from semantic query patterns and at least one of one or more entities or information associated with the one or more entities. The transmitting component transmits the one or more query formulation suggestions for presentation.

A further embodiment of the invention is directed to one or more computer-storage media storing computer-useable instructions that, when used by a computing device, cause the computing device to perform a method for identifying query formulation suggestions in response to receiving a search query. The method includes receiving at least a portion of the search query and, contemporaneous to a formulation of the at least the portion of the search query, identifying one or more query formulation suggestions by semantically analyzing the at least the portion of the search query. The one or more query formulation suggestions comprise query-log-based query suggestions and semantic-pattern-based query suggestions that are derived from semantic query patterns and at least one of one or more entities or information associated with the one or more entities. The information comprises one or more attributes and one or more attribute values. The method further includes transmitting the query formulation suggestions for presentation, wherein the query formulation suggestions are configured to be selectable by a user to formulate the search query. Still further, the method includes receiving a user selection of one of the query formulation suggestions, and modifying the at least the portion of the search query according to the selected query formulation suggestion.

Yet another embodiment of the invention is directed to a method performed by a computing device having a processor and memory for identifying query formulation suggestions. The method includes receiving at least a portion of a search query and identifying one or more semantic-pattern-based query suggestions by semantically analyzing the at least the portion of the search query. The one or more semantic-pattern-based query suggestions are derived from semantic query patterns, one or more entities, and information associated with the one or more entities, and the information includes attributes and attribute values such that the one or more entities are used to identify the one or more semantic-pattern-based query suggestions. The method further includes identifying a set of the query formulation suggestions to transmit for presentation, and transmitting the set of query formulation suggestions for presentation. The one or more query formulation suggestions are configured to be selectable by a user to formulate the search query.

In another embodiment, the invention is directed to one or more computer-storage media storing computer-useable instructions that, when used by a computing device, cause the computing device to perform a method for identifying query formulation suggestions. The method includes receiving at least a portion of a search query and semantically analyzing the at least the portion of the search query to identify one or more semantic-pattern-based query suggestions that are generated by at least one of semantic query patterns, one or more entities, and information associated with the one or more entities. The method further includes transmitting the one or more semantic-pattern-based query suggestions for presentation. The one or more semantic-pattern-based query suggestions being configured to be selectable by a user to formulate the search query. Still further, the method includes receiving a user selection of one of the one or more semantic-pattern-based query suggestions. In response to the user selection, the method additionally includes modifying the at least the portion of the search query based on the selected semantic-pattern-based query suggestion. Further, the method includes updating a set of search results based on the modified search query.

In another embodiment, the invention is directed to a user interface embodied on one or more computer-storage media, the user interface for presenting query formulation suggestions. The user interface includes a query display area, an attribute suggestion presenting area and an attribute value suggestion presenting area. The query display area is configured for displaying at least a portion of a search query received from a user, wherein the at least the portion of the search query is semantically analyzed to identify one or more semantic-pattern-based query suggestions by semantically analyzing the at least the portion of the search query, and wherein the one or more semantic-pattern-based query suggestions includes at least one of one or more entities, one or more attributes, or one or more attribute values. The attribute suggestion presenting area is configured for presenting a list of attributes as query formulation suggestions, each attribute in the list of attributes being associated with at least one of the one or more entities. The attribute value suggestion presenting area is configured for presenting a list of attribute values as the query formulation suggestions upon receiving a user selection of one of the attributes, each attribute value in the list of attribute values being associated with the selected attribute. The attribute value suggestion presenting area is arranged relative to the attribute suggestion presenting area such that the attribute values associated with a particular one of the attributes are presented in proximal association with their respective corresponding attributes.

In another embodiment, the invention is directed to one or more computer-storage media storing computer-useable instructions that, when used by a computing device, cause the computing device to perform a method for generating query formulation suggestions. The method includes receiving a plurality of search queries from a query log, each of the plurality of search queries being associated with a respective set of matching entities, and identifying at least one semantic query pattern from the plurality of search queries. The method further includes identifying a weight for each identified semantic query pattern; identifying a plurality of semantic categories from an entity database, each of the plurality of semantic categories being associated with a respective set of entities; identifying at least one term or phrase (e.g., an n-gram) commonly associated with at least one of the semantic categories; identifying a plurality of semantic attributes as they pertain to the plurality of semantic categories; identifying at least one semantic attribute pattern from the plurality of semantic attributes; identifying a weight for each identified semantic attribute pattern; and generating a text-parser from the at least one semantic query pattern and respective weights, the at least one semantic category term or phrase and respective weights, and the at least one semantic attribute patterns and respective weights. The text parser is configured for use in parsing input user queries or portions thereof.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or I/O components 120. Presentation component(s) 116 present data indications to a user or other device. Exemplary presentation components include a display device, speaker, printing component, vibrating component, etc.

The I/O ports 118 allow the computing device 100 to be logically coupled to other devices including I/O components 120, some of which may be built in. Illustrative components include a microphone, joystick, game pad, satellite dish, scanner, printer, wireless device, and the like.

Figure 2:
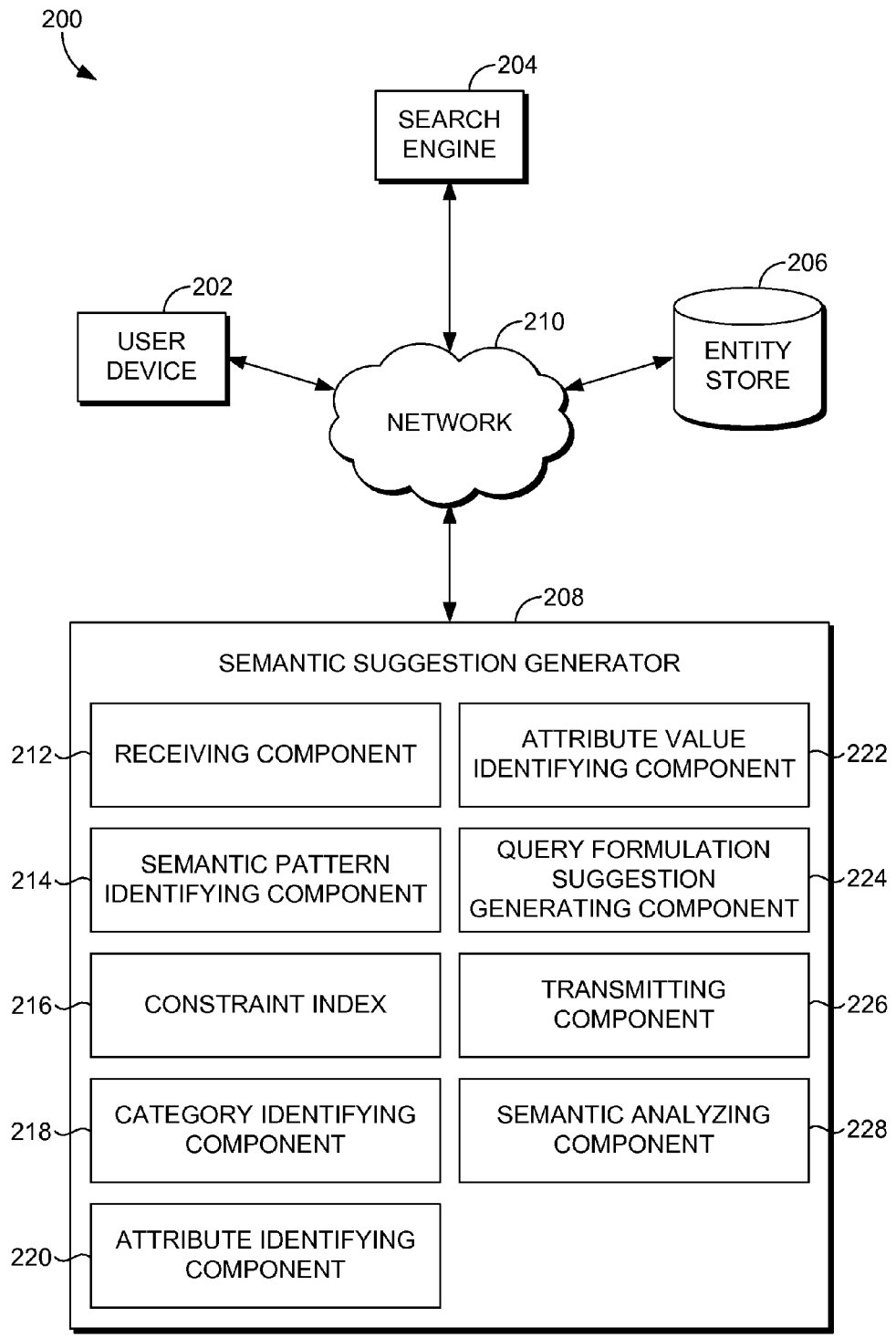
FIG. 2 is a block diagram of an exemplary system in which embodiments of the invention may be employed.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein. Among other components not shown, the system 200 includes a user device 202, a search engine 204, an entity store 206 and a semantic suggestion generator 208, all in communication with one another through a network 210. The network 210 may include, without limitation, one or more local area networks (LANs) and/or wide area networks (WANs). Such networking environments are commonplace in offices, enterprise-wide computer networks, intranets and the Internet. Accordingly, the network 210 is not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, search engine computing devices, or the like. By way of example only, the semantic suggestion generator 208 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The entity store 206 is configured to store various types of information used by the semantic suggestion generator 208 to identify query formulation suggestions based on a semantic analysis of at least the portion of the search query entered by the user. The type of information stored in the entity store 206 may include, for example, entities, categories, attributes, and attribute values, as more fully described below. More specifically, in various embodiments, the information stored in the entity store 206 may include, without limitation, entities or items (e.g., products available for commerce, locations, people, companies, organizations, and the like), categories to which such entities may correspond, attributes associated with the entities, and attribute values associated with the entities as they pertain to particular attributes thereof. The information in the entity store 206 may also include common queries that previously have been issued or submitted to the search engine 204, in addition to popular or frequently selected interpretations. In an embodiment, at least a portion of these common queries may be stored in a query log such that the query log may be accessed to identify common queries.

The information stored in the entity store 206 may be used as query formulation suggestions. Query formulation suggestions, as used herein, refer to information that can be used to discover a user's true intent by assisting the user to formulate a query, for instance, by expanding upon or clarifying a partial query that has been entered by the user. As such, in one embodiment, query formulation suggestions are first presented prior to the determination and/or presentation of any search results determined to satisfy the query (or partial query). As will be discussed in further detail, in embodiments hereof, search results may be determined and presented when an input search query, or portion thereof, reaches a semantic boundary. As such, if a partial search query is entered, query formulation suggestions may be presented before search results are even identified. However, once the input query is modified to the point that a semantic boundary is reached, search results may be determined and presented. One or more different or updated query formulation suggestions may then be presented based on the modified search query. Thus, those of skill in the art will understand that query formulation suggestions differ from search results not only in content (although in some instances the content may be substantially similar), but also in their use upon user selection thereof. Selection and use of query formulation suggestions is more fully described below.

Query formulation suggestions may include various types of suggestions for formulating queries including, by way of example and not limitation, query-log-based query suggestions, semantic-pattern-based query suggestions (e.g., template-based query suggestions), categories associated with a search query, attributes associated with one or more identified entities, and attribute values associated with one or more identified entities. It should be noted that query formulation suggestions are generally identified, presented, and selected contemporaneously with query formulation, not post-query submission.

"Query-log-based query suggestions" are suggestions that attempt to aid the user in formulation of a search query by providing the user with the most popular previously-submitted search queries identified from a query log that correspond to the character sequence entered into the search box at a particular instance. "Semantic-pattern-based query suggestions," on the other hand, refer to query formulation suggestions that are generated from semantic query patterns (e.g., templates). When a search query, or portion thereof, is submitted to the search system, a database of semantic query patterns (such as "<brand> camera," as more fully described below) is accessed and an attempt is made to identify one or more semantic query patterns that correspond in some way to the input search query. In generating semantic-pattern-based query suggestions, a database or entity store 206 may be used. By accessing entities and their respective associated information from the entity store 206, it can be ensured that only those semantic-pattern-based query suggestions that match known entities are returned. As such, before being presented to a user, semantic-pattern-based query suggestions are compared to entities stored in the entity store 206. In one embodiment, if a particular semantic-pattern-based query suggestion is not found in the entity store 206, it is not returned to the user as a query suggestion, as it may not exist (e.g., such as a particular product that does not exist), or at least it does not match with the known information in the entity store 206. But if it is found, it may be returned to the user, as further discussed herein. Semantic-pattern-based query suggestions may be presented to the user in much the same way as query-log-based query suggestions.

"Entities," as used herein are items having known information (e.g., categories, attributes, and attribute values) associated therewith that is organized and stored in the entity store 206. In some instances, entities have associated categories, but in another instances they do not. "Categories," "attributes" and "attribute values," as these terms are utilized herein, represent various hierarchical characteristics of entities and are useful in filtering or formulating received search queries (or portions thereof) for providing a user with as accurate an answer to a particular query as possible. While an entity is described herein as a particular product in one embodiment, in other embodiments, entities may also include other items that are not considered "products." For instance, for exemplary purposes only, entities may include a particular product, a business, an organization, a person, or the like. Further, an entity may be a specific location that has associated categories, attributes, and attribute values from which the user may select to formulate the search query. The definition of an entity, as used herein, is not meant to be limiting, but may apply to many things that are potentially capable of having associated hierarchical characteristics.

By way of example, suppose a user enters the character sequence "role" into the search query input area. As a result, "rolex" may be identified as a potential query formulation suggestion by either identifying it as a query-log-based query suggestion or as a semantic-pattern-based query suggestion. Here, "rolex" may be identified as a brand of watches, or may be a popular query, and may also correspond to one or more entities found in the entity index 206. The entity "rolex" may be associated with the category "watches," and such category may be returned to the user as a suggested category that may then be utilized to further formulate the user's search. Similarly, if a user enters the alphanumeric characters "facebo" into the search query input area, it may lead to the identification of the query formulation suggestion "facebook," which may correspond to one or more entities in the entity store 206. Further, the entities may include associated categories, such as "Web," such that an entered search query for "facebo" may return "Web" as a suggested category. This provides the user with an indication as to how the portion of the entered search query has been interpreted.

In embodiments, a received search query may be identical or substantially similar to an identified category. For example, the search query "digital cameras" may result in a plurality of entities having a category "digital cameras." While this would not in and of itself necessarily help in refining the user's search, armed with the knowledge that the category matches the intent of the user's search, various lower level hierarchical characteristics, e.g., attributes and attribute values, associated with the identified entity may be suggested to the user as possible query formulation suggestions. As another example, suppose the user enters the alphanumeric characters "digital slr" as a portion of a search query into the search query input area. The system of embodiments of the present invention may access the entity store 206 to determine one or more entities corresponding to the query "digital slr." Since there are several models of cameras that are SLR, there are likely several entities, if not hundreds of entities, that may be identified. The category in this instance may be "digital cameras." The previous description of categories may apply to even those situations where the query is not substantially similar to a stored category.

In embodiments, the entity store 206 is configured to be searchable for one or more of the items stored in association therewith. It will be understood and appreciated by those of ordinary skill in the art that the information stored in association with the entity store 206 may be configurable and may include any information relevant to entities, categorizations of entities, characteristics of entities, and the like. The content and volume of such information are not intended to limit the scope of embodiments of the present invention in any way. Further, though illustrated as a single, independent component, the entity store 206 may, in fact, be a plurality of storage devices, for instance, a database cluster, portions of which may reside on the semantic suggestion generator 208, another external computing device (not shown), and/or any combination thereof.

As previously stated, the entity store 206 is configured to store attributes for entities as they pertain to particular categories. Attributes are characteristics of the entities belonging to a particular category that may be suggested to a user to further describe or refine the user's intent upon entering a search query. For example, attributes for the entity "Canon PowerShot SX30" may be associated with the category "digital cameras." The entity "Canon PowerShot SX30," by way of example only, may be associated with the attributes "megapixels," "color," "zoom," "lens," "viewfinder type," "image stabilization," "brand," "type," "model," and the like. These attributes may be used to further refine a search query for "Canon cameras," for example, to aid in discovering the user's true intent.

In addition to entities, categories and attributes for entities, the entity store 206 also is configured to store attribute values as they pertain to particular entities and associated attributes. For instance, for the attribute "color" associated with the entity "Canon PowerShot SX30," attribute values may include, for instance, "black," "blue," "red," "silver," etc. In general, values to suggest are identified by considering the distribution of value for all entities that match the current query. For example, for "canon cameras," there may be over 100 camera entities with "brand=canon." Among these, some are tagged with "color=black." Others may be tagged with "color=silver." The distribution of these values along with the score and popularity of the entities is used to determine the set and ranking of values presented to the user. Attribute values may be suggested to the user as query formulation suggestions to aid in further describing or refining the user's intent upon receiving a search query. This effectively blends browsing and searching experiences of web scale databases. As mentioned, attributes and attribute values are dependent upon the particular entity with which they are associated, and also are dependent upon the current state of the search query. For instance, if the search query already has a color specified, the attribute "color" may not even be presented to the user. Similarly, if the user has specified in the search query or has already selected an attribute value of "Canon," the system may not present the attribute of "brand" to the user.

While described in the context of search queries and assisting the user to define a search query, embodiments of the present invention may also be used in the context of related search, related categories, related concepts, etc. For instance, in one embodiment, alternative categories may be displayed for the user in addition to the best category associated with the entities that correspond to the search query. These alternative categories can be selected by the user if the user is not satisfied with the category chosen by the system. This functionality is further described below.

With continued reference to FIG. 2, each of the user device 202, the search engine 204 and the semantic suggestion generator 208 may be any type of computing device, such as computing device 100 described with reference to FIG. 1, for example. The components may communicate with each other via a network 210, which may include, without limitation, one or more local area networks (LANs) and/or wide area networks (WANs). Such networking environments are commonplace in offices, enterprise-wide computer networks, intranets, and the Internet. It should be understood that any number of user devices, segments, and hybrid-distribution system servers may be employed within the system 200 within the scope of the present invention. Each may comprise a single device or multiple devices cooperating in a distributed environment. For instance, the search engine 204 may comprise multiple devices arranged in a distributed environment that collectively provide the functionality of the search engine 204 described herein. Additionally, other components not shown may also be included within the system 200, while components shown in FIG. 2 may be omitted in some embodiments.

The user device 202 may be any type of computing device owned and/or operated by an end user that can access the network 210. For instance, the user device 202 may be a desktop computer, a laptop computer, a tablet computer, a mobile device, or any other device having network access. Generally, an end user may employ the user device 202 to, among other things, access electronic documents by submitting a search query to the search engine 204. For instance, the end user may employ a web browser on the user device 202 to access and view electronic documents stored in the system 200. According to embodiments of the present invention, the user additionally may be able to interact with the user device 202 by selecting an attribute and an attribute value, which further refines an input search query, as more fully described below. While the user device 202 has been described as communicating by way of the network 210, embodiments of the present invention may also be used locally on a device, such as to improve desktop search, email search, or application search on Smartphone, and as such a network, such as the network 210, may not be required.

The search engine 204 may comprise multiple components that are responsible for receiving an entered search query and identifying one or more documents that are relevant to that particular search query. In embodiments of the present invention, multiple sets of relevant documents may be presented to the user over the course of time from when the search query is first entered, to when a satisfactory response is received by the user through search query formulations utilizing attributes, attribute values, and the like. As such, the search engine 204 and the semantic suggestion generator 208, in one embodiment, are generally in communication with one in another while a particular search query is being developed or completed. In an alternative embodiment, the search engine 204 and the semantic suggestion generator 208 are not associated with each other. For instance, at each semantic boundary (e.g., completion of a term in the search query, addition of an attribute value to the search query), the search results are updated in one embodiment. The search engine 204 may utilize one or more search indexes that have indexed documents from the web so that the most relevant search results can be identified in an efficient manner. In addition to web documents, the search engine may provide results from semi-structured databases based on the semantic constraints specified in the query.

As mentioned, in one embodiment, search results are updated when a semantic boundary is reached, such as when a term in the search box has been completed. This may occur when a new term has been added to the search query by either user input or by a user selection of a query formulation suggestion, which causes the search query to be modified according to the selected query formulation suggestion.

As shown in FIG. 2, the semantic suggestion generator 208 includes a receiving component 212, a semantic pattern identifying component 214, a constraint index 216, a category identifying component 218, an attribute identifying component 220, an attribute value identifying component 222, a query formulation suggestion generating component 224, a transmitting component 226, and a semantic analyzing component 228. In some embodiments, one or more of the components 212, 214, 216, 218, 220, 222, 224, 226, and 228 may be implemented as stand-alone applications. In other embodiments, one or more of the components 212, 214, 216, 218, 220, 222, 224, 226, and 228 may be integrated directly into the operating system of a computing device such as the computing device 100 of FIG. 1. It will be understood by those of ordinary skill in the art that the components 212, 214, 216, 218, 220, 222, 224, 226, and 228 illustrated in FIG. 2 are exemplary in nature and in number and should not be construed as limiting. Any number of components may be employed to achieve the desired functionality within the scope of embodiments hereof.

Additional components of the semantic suggestion generator 208 (not shown) may include, without limitation, a processing unit, internal system memory, and a suitable system bus for coupling various system components, including one or more data stores for storing information (e.g., files and metadata associated therewith). The semantic suggestion generator 208 typically includes, or has access to, a variety of computer-readable media. By way of example, and not limitation, computer-readable media may include computer-storage media and communication media. In general, communication media enables each computing device to exchange data via a network, e.g., network 210. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system environment 200 is merely exemplary. While the semantic suggestion generator 208 is illustrated as a single unit, one skilled in the art will appreciate that the semantic suggestion generator 208 is scalable. For example, the semantic suggestion generator 208 may in actuality include a plurality of computing devices in communication with one another. Moreover, the entity store 206, or portions thereof, may be included within, for instance, the semantic suggestion generator 208, a Website source, or a third-party service as a computer-storage medium. The single unit depictions are meant for clarity, not to limit the scope of embodiments in any form.

The receiving component 212 is configured to receive search queries, or portions thereof, input by users (e.g., users of user device 202). Such information may be received in real-time upon entry by a user. Search queries may also be received by the receiving component 212 from one or more query logs having historical query information included therein for one or both of a particular user and a group of users as a whole. Received search queries, or portions thereof, may be semantically analyzed, as further described herein, to identify one or more query formulation suggestions to present to the user as suggestions for formulating the current search query. Semantically analyzing at least a portion of a search query comprises hypothesizing the user intended task or category and extracting specified attribute values by tagging words in the query with their attributes. For instance, the query "red canon digital camera" may be identified as a category=digital camera, brand=canon, and color=red. Query formulation suggestions may be generated, in one instance, using templates associated with queries, attributes, categories, attribute values, etc. Thus, the receiving component 212 is additionally configured to receive information from the entity store 206. The receiving component 212 is further configured to receive indications of user selections of query formulation suggestions. Such indications may be received, by way of example only, from user device 202.

The semantic pattern identifying component 214 is configured to identify semantic patterns associated with queries, categories, attributes and attribute values. In embodiments, the semantic pattern identifying component 214 identifies key terms/phrases commonly associated with categories corresponding to particular entities. As mentioned, semantic patterns are similar to templates, in that at least a portion of a semantic query pattern identifies a particular category or attribute that is filled in based on the received search query. Templates may be stored in a semantic grammar index, for instance, as shown herein in FIG. 32.

In embodiments, semantic query patterns may be identified algorithmically from information stored in query logs and/or the entity store 206. Semantic query patterns, that is, linguistic patterns contained in received queries, will vary among languages and are determined based upon knowledge of how particular entities are commonly phrased in the language in which a search query is received. Alternatively or additionally, for instance in situations where standard language-specific linguistic patterns are unable to be identified or are clearly not followed, semantic query patterns of interest may be identified manually via editorial intervention.

In embodiments, weights or probabilities (that is, the likelihood of a particular semantic query pattern being a pattern that represents the true intent of a user) also may be determined by the semantic pattern identifying component 214. In embodiments, such weights may be determined based upon one or both of availability and interest. In terms of availability, the semantic pattern identifying component 214 may examine the data contained in the entity store 206 and estimate how frequently particular items or entities are likely to occur. For instance, in a commerce setting, the semantic pattern identifying component 214 may examine the data on product availability that is contained in the entity store 206 and estimate how frequently each entity is likely to be offered or available. The more frequently a particular entity will be offered or available, the higher the probability or weight assigned to that entity will be.

In terms of interest, the semantic pattern identifying component 214 may examine input user queries and/or user-behavior with respect to the entities stored in association with the entity store 206, and generate a weight that represents relative user interest in a particular entity. For instance, in the commerce setting, the semantic pattern identifying component 214 may examine user queries and/or behavior with respect to a particular product and estimate the relative interest of users in that product. Products with higher user interest will then be assigned a higher probability or weight. In embodiments wherein both availability and interest are utilized to determine weights or probabilities of given entities/items, a single weight representing some combination of the availability weight and the user interest weight may be determined.

In embodiments, semantic attribute value patterns may be identified algorithmically from information stored in query logs and/or the entity store 206. Semantic attribute value patterns, that is, linguistic patterns contained in attribute values, will vary among languages and are determined based upon knowledge of how particular entities are commonly phrased in the language in which an attribute value is identified. Alternatively or additionally, for instance in situations where standard language-specific linguistic patterns are unable to be identified or clearly are not followed, semantic attribute value patterns of interest may be identified manually via editorial intervention.

The constraint index 216 is configured to extract entities from the entity store 206 with their respective categories, attributes, attribute values and corresponding weights and to determine unreasonable semantic patterns for each entity—that is, to determine semantic patterns that are illogical or are highly unlikely. Thus, if a particular category is rarely in the entity store 206 associated with an entity having a particular attribute, that category/attribute pair would be determined to be illogical for the particular entity. More commonly, constraints among attributes within a particular category may be applied such that the term "Microsoft PlayStation" is not suggested because the brand "Microsoft" and the product "PlayStation" are incompatible. The constraint index 216 may be utilized to filter query formulation suggestions, which will be discussed further herein. In some instances, the constraint index 216 also filters semantic patterns identified by the semantic pattern identifying component 214 if an attribute is inconsistent with currently specified constraints. This functionality is more fully described below. In embodiments, the constraint index 216 is further configured to build a compressed binary representation of the extracted data.

In embodiments, the constraint index 216 is configured to build a compressed binary entity index that allows the semantic suggestion generator 208 to efficiently determine the top attributes and attribute values matching a given set of constraints in a particular category and an optional prefix, along with their weights. In this way, hypotheses that cannot be true can be quickly eliminated leading to increased efficiency in arriving at suggestions to aid in determining user intent. For instance, if the user is searching a directory that is organized alphabetically and the user inputs the character "a," the compressed binary entity index can quickly filter the directory and eliminate all items not beginning with the character "a."

The category identifying component 218 is configured to identify the top category associated with a query. In embodiments, the category identifying component 218 is further configured to identify one or more categories that are related to the query, but that may not have been initially selected as the category thought to be most relevant to the search query. In embodiment, categories are stored in the entity store 206 in relation to their associated entities. In some embodiments, an entity may not have an associated category, and as such a category is not displayed on the user interface.

Similarly, the attribute identifying component 220 is configured to identify at least one attribute associated with an entity. Attributes, as used herein, classify different attributes associated with an entity, and are specific to the entity to which they correspond. For instance, one entity may be associated with a particular attribute, but that attribute may not be associated with a different entity. In embodiments the attribute identifying component 220 is further configured to identify one or more attributes that are related to the entity, but that may have not been identified as one of the most relevant attributes. Further, the attribute value identifying component 222 is configured to identify at least one attribute value associated with an entity. Attribute values, as used herein, are values that correspond directly to the attribute and entity to which they correspond. For example, if a specific type of watch does not come in the color purple, "purple" is not displayed to the user as an attribute value corresponding to the attribute "color." For example, one entity may be associated with a particular attribute, but that attribute may not be associated with a different entity. In embodiments the attribute value identifying component 222 is further configured to identify one or more attribute values that are related to the entity but may not have been identified as one of the most relevant attributes.

The query formulation suggestion generating component 224, given a search query (or portion thereof), is configured to construct a lattice of possible interpretations of the input query (or query portion). The lattice is dynamically composed utilizing the semantic patterns identified by the semantic pattern identifying component 214 and applying a search algorithm (for instance, the A* search algorithm well known to those of ordinary skill in the art) to find the search query completion path or paths that represent the most likely intent of the user while preserving the constraints imposed by the constraint index 216. These types of algorithms can also find extensions of a partial inputted search query. Those completion paths (refined queries) identified as most likely intended by the user are those that are identified as having the highest overall weights, that is, the highest probabilities.

The transmitting component 226 is configured to transmit query formulation suggestions, which may take the form of query-log-based query suggestions, semantic-pattern-based query suggestions, entities, categories, attributes, attribute values, or the like for presentation. For instance, the query "digital ca" may result in a query-log-based query suggestion of "digital camera." Similarly, the query "canon in ca" may result in a category completion (e.g., query formulation suggestion) of "canon in cameras." Further, the query "cameras by br" may result in the attribute completion (e.g., query formulation suggestion) of "cameras by brand." The query "cameras by can" may result in an attribute value completion (e.g., query formulation suggestion) of "cameras by canon."

The semantic analyzing component 228 is configured to semantically analyze a received search query, or a portion thereof in order to identify the most relevant query formulation suggestions based on the received search query. In embodiments, algorithms are used to semantically analyze search queries. In one embodiment, as previously described, semantic-pattern-based query suggestions are derived using semantic query patterns and the entity store. For instance, semantic-pattern-based query suggestions may be compared to known entities in the entity store prior to being transmitted for presentation. For example, for the partial query "canon ca," the system searches through query records, query/attribute templates, category, etc. to find possible completions of the query that are also consistent with the known information in the entity store 206. Suppose that "<brand> camera" is in the "digital camera" category and "<brand> car stereos" is in the "car stereos" category as query templates. Possible semantic-pattern-based query suggestions may include, for exemplary purposes only, "canon camera" and "canon car stereos." However, when consulting with the entity store 206, it is determined that there is no such entity associated with the category "car stereos" with the brand "canon." This indicates that "canon car stereos" is an invalid query formulation suggestion, and thus is not provided as a suggestion.

In some instances, multiple query templates are stored for different categories that match the same query. For example, the partial query "can" may be completed to "canon" using the template "<brand>" in both the "digital camera" and "printers" category. In other words, there are entities in both categories with "canon" as the brand. In such scenarios, we show category disambiguation for the completion suggestion "canon," as further described herein. It is possible that there are other completions for "can" that are also ambiguous, such as "candy" as a type of food or the name of a movie. Thus, within a single suggestion list, there may be multiple completion suggestions that are category ambiguous.

Once potential query completion suggestions are identified, if a user selects a completion or if the system has a high enough confidence for a particular completion, the system may further identify query formulation suggestions for that particular completion about which the system has a high degree of confidence. For example, if the system knows that "canon earner" completes to "canon camera" with a high probability, query formulation suggestions such as "canon camera by resolution," "canon camera by color," etc., may be presented to the user. Even if the user enters "canon camera," the system may still first try to complete the query before suggestion query formulation suggestions.

Utilizing the components 212, 214, 216, 218, 220, 222, 224, 226, and 228, the semantic suggestion generator 208 is configured to construct a trie from one or more query logs, each query being annotated with its top weighted interpretations. Then, given a partial query, the semantic suggestion generator 208 is able to locate the top weighted completion paths from the trie and transmit them for presentation as query formulation suggestions. In instances wherein not enough suggestions are determined to qualify as "top" suggestions, for instance where a minimum threshold number of query formulation suggestions is desired, additional query formulation suggestions may be identified by the query formulation suggestion generating component 224 (even though they may not meet a minimum desired threshold weight, for instance). Any semantically duplicate suggestions may be eliminated. Because a trie structure is utilized, if a category/attribute/attribute value suggestion is the semantic prefix of one or more remaining suggestions, an attribute extension suggestion may be inserted below such category/attribute/attribute value suggestion upon presentation. In embodiments, the semantic suggestion generator 208 may render query trie suggestions with multiple interpretations as an annotated query with disambiguation information. These embodiments are more fully described below with reference to the screen displays of FIGS. 3-26.

Figure 3:
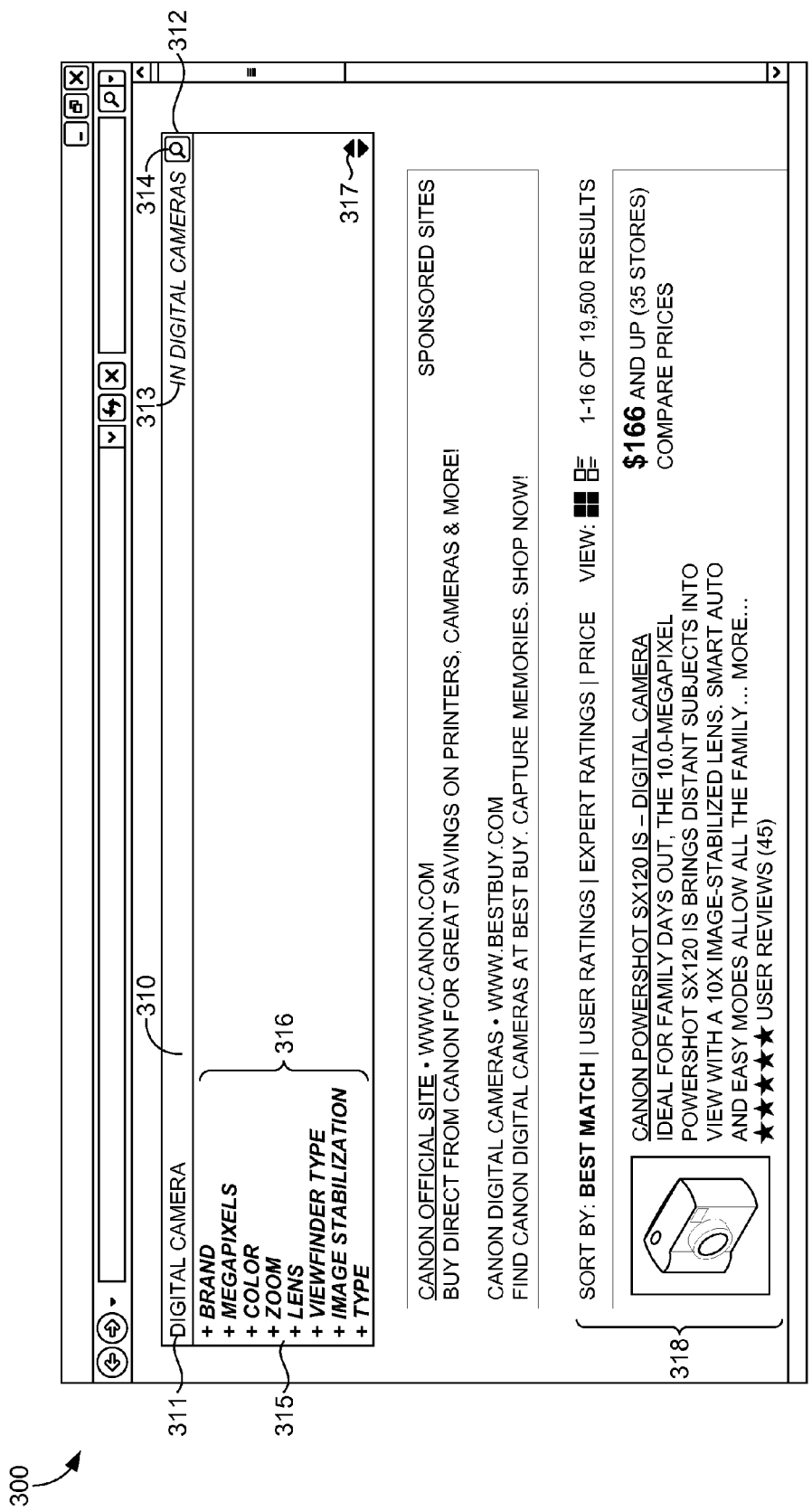

Turning now to FIG. 3, illustrated is a screen display of a user interface 300, in accordance with an embodiment of the present invention. Initially, a search box 310, or a query display area, is the area on the user interface where the user enters a search query. Here, the query "digital camera" 311 has been entered by a user into the search box 310. Once the system receives the search query, a database, such as the entity store 206 illustrated in FIG. 2, is accessed to first determine if one or more entities correspond to the received search query. If so, the system identifies a category associated with the one or more entities. In one embodiment, more than one category is identified such that one category is identified as the most relevant or best category, and the others may be displayed on the search results page as alternate or related categories. As shown in FIG. 3, the identified category 313 is displayed in a different portion of the search box, such as the category display area. This may be called the category display area. The category may be displayed in a number of locations on the user interface 300, but is shown in this location for exemplary purposes only. A search button 314 is illustrated, and allows the user to indicate that he or she would like the search to initiate.

A suggestion area 315, as shown in FIG. 3, displays query formulation suggestions. Here, the query formulation suggestions comprise a list of attribute suggestions 316 that are identified as being relevant to the matching entities. The attribute suggestions 316 include "brand," "megapixels," "color," "zoom," "lens," "viewfinder type," "image stabilization," and "type." Additional attribute suggestions, if there are any, may be viewed by using the up and down arrows 317. In one embodiment, a user may select an attribute, which can assist the user in further defining the user's search query. In response to the submitted search query, search results 318 are displayed for the user. As mentioned, the attribute suggestions are stored in a database and are organized based the entities to which they correspond.

FIG. 4 illustrates another screen display of a user interface 400, in accordance with an embodiment of the present invention. FIG. 4 illustrates a search box 410 with a search query 412 entered, which, here, is "digital camera." In the embodiment of FIG. 4, query formulation suggestions, which comprises both query completion suggestions 414 and query formulation suggestions, which here comprises attribute suggestions 416, are displayed in the suggestion area, which blends these two user experiences together. The user may be intending to look for digital camera reviews, which is a popular query suggestion, or may be looking for a specific type of digital camera, in which case the user may utilize the attribute suggestions 416.

Referring to FIG. 5, another screen display of a user interface 500 is illustrated, in accordance with an embodiment of the present invention. The search box 510 includes a search query 511 of "digital camera brand." Here, after viewing the user interface of FIG. 4, the user has made a selection of "brand" attribute 518 out of the attribute suggestions 516 displayed in the suggestion area 513. "Brand" is not actually added to the search query, but acts as a placeholder for an attribute value that may be selected by the user. Query completion suggestions 514, which are suggestions that may have already been entered into the search engine by other users (e.g., popular search queries) are also displayed in this embodiment. A user selection of an attribute may take many forms, including a mouse click, hovering over the selection, selecting the "enter" key on a keyboard, a user's touch on a touchscreen, gestures, or the like. For instance, a user may simply hover over the "brand" attribute 518. In this case, a list of attribute value suggestions 522 may be displayed in the suggestion area 520. For example, the attribute value suggestions 522 listed are brands that manufacture digital cameras. As mentioned, not only are attribute suggestions stored in associated with entities, but attribute value suggestions are also stored such that when a user selects an attribute, as shown in FIG. 5, attribute value suggestions associated with the selected attribute value can be identified from a database and displayed for user selection. The suggestion area 520 may be divided into two or more areas, most notably an attribute display area for displaying a list of attribute suggestions and an attribute value display area for displaying a list of attribute value suggestions.

In one embodiment, in addition to user a mouse or keyboard to select query formulation suggestions, the user may also select/filter these suggestions by typing or otherwise entering the name/template of the query formulation suggestion directly. For instance, the user may type "canon camera by res" or "canon camera 10 megap." In such instances, query completion suggestions may be presented that attempt to complete the attribute or value. Depending on the scenario, there may be multiple query completion suggestions such a scenario. For instance, a partial query of "canon camera b" may result in the query completion suggestions of, for example, "canon camera black," "canon camera blue," etc. There may also be additional query completion suggestions from previously seen queries (e.g., popular queries), such as "canon camera bag."

Figure 6:
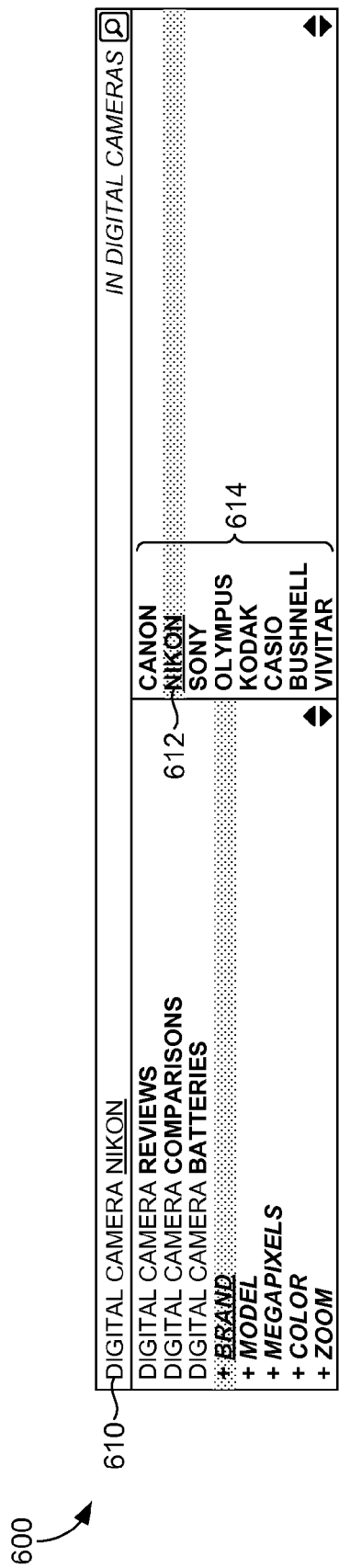

FIG. 6 illustrates another screen display of a user interface 600, in accordance with an embodiment of the present invention. Here, continuing from FIG. 5, the user has now selected a particular brand from the list of attribute value suggestions 614. The user has selected the "Nikon" attribute value 612. The user selection of an attribute may take on one of many forms of selection, including a mouse click, hovering over the name, pressing the "enter" key, etc. As a result of the user selection of the "Nikon" attribute value 612, the search query 610 is further defined to now include "Nikon," and is now "digital camera Nikon." At this point, a semantic boundary has been reached. As such, the previous search results displayed for the search query "digital camera" may be updated to include the most relevant search results for "digital camera Nikon." Similarly, if the user would have selected "Sony" instead of "Nikon," "Sony" would have been added to the search query, thus further defining the user's actual intent.

Figure 7:
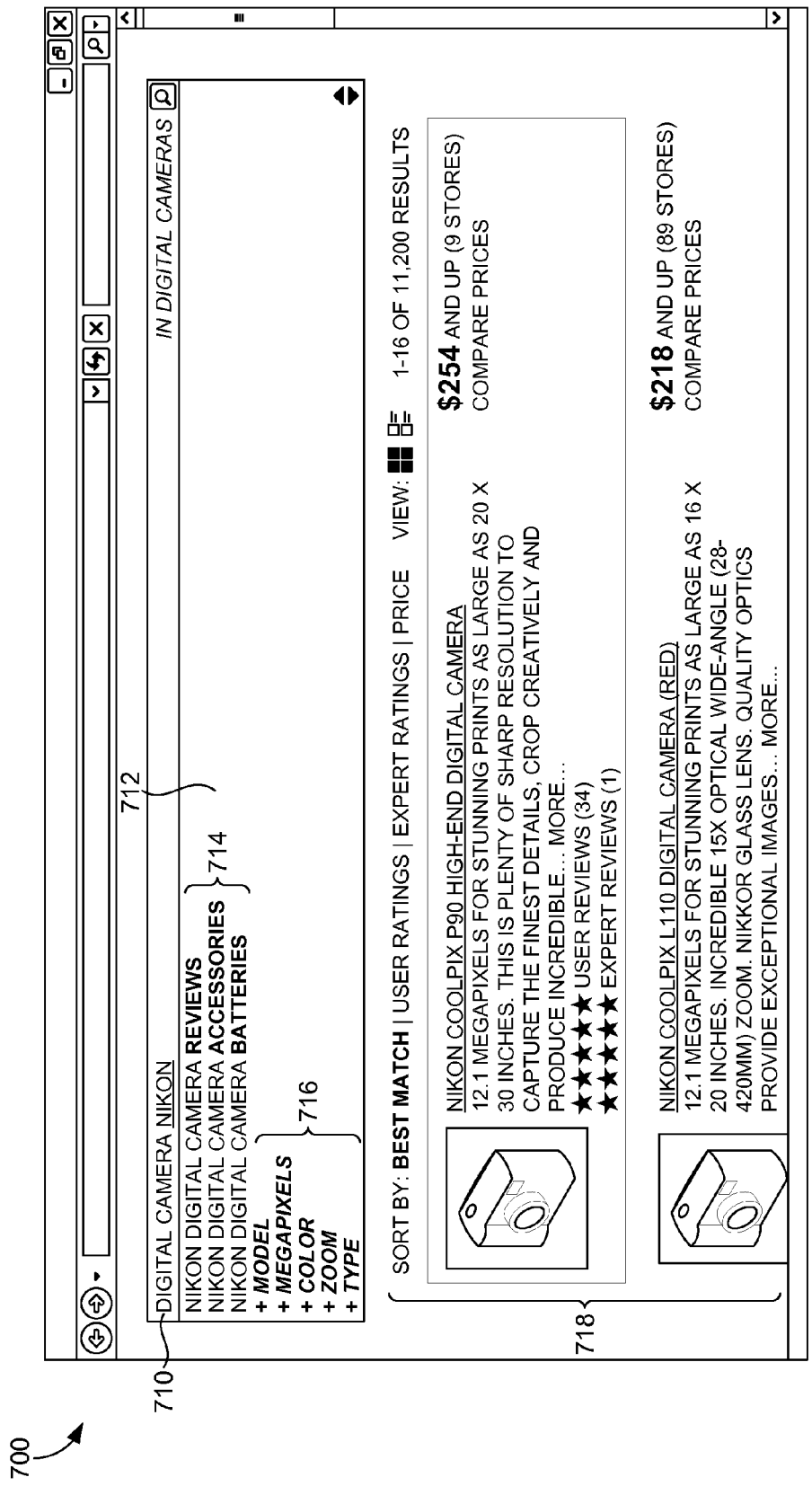

FIG. 7 illustrates another screen display of a user interface 700, in accordance with an embodiment of the present invention. Continuing from FIG. 6, the search query 710 is now "digital camera Nikon." Displayed the suggestion area 712 is a list of query completion suggestions 714 and a list of query formulation suggestions, which here is a list of attribute suggestions 716. However, the list of attribute suggestions 716 has changed since the last viewing of this list in FIG. 6. Here, the attribute suggestions have been filtered. Since the user has already selected a brand, the "brand" attribute is no longer present and viewable in the list of attribute suggestions 716. As such, the list of attribute suggestions 716 is dynamic in the respect that it understands that "brand" no longer needs to be shown to the user, as the other attribute suggestions not yet selected by the user are the ones that will further help to define the user's true intent. The search results 718 are also shown in FIG. 7 and, as shown, have been updated to include only those results applicable to the most recent version of the search query.

Figure 8:
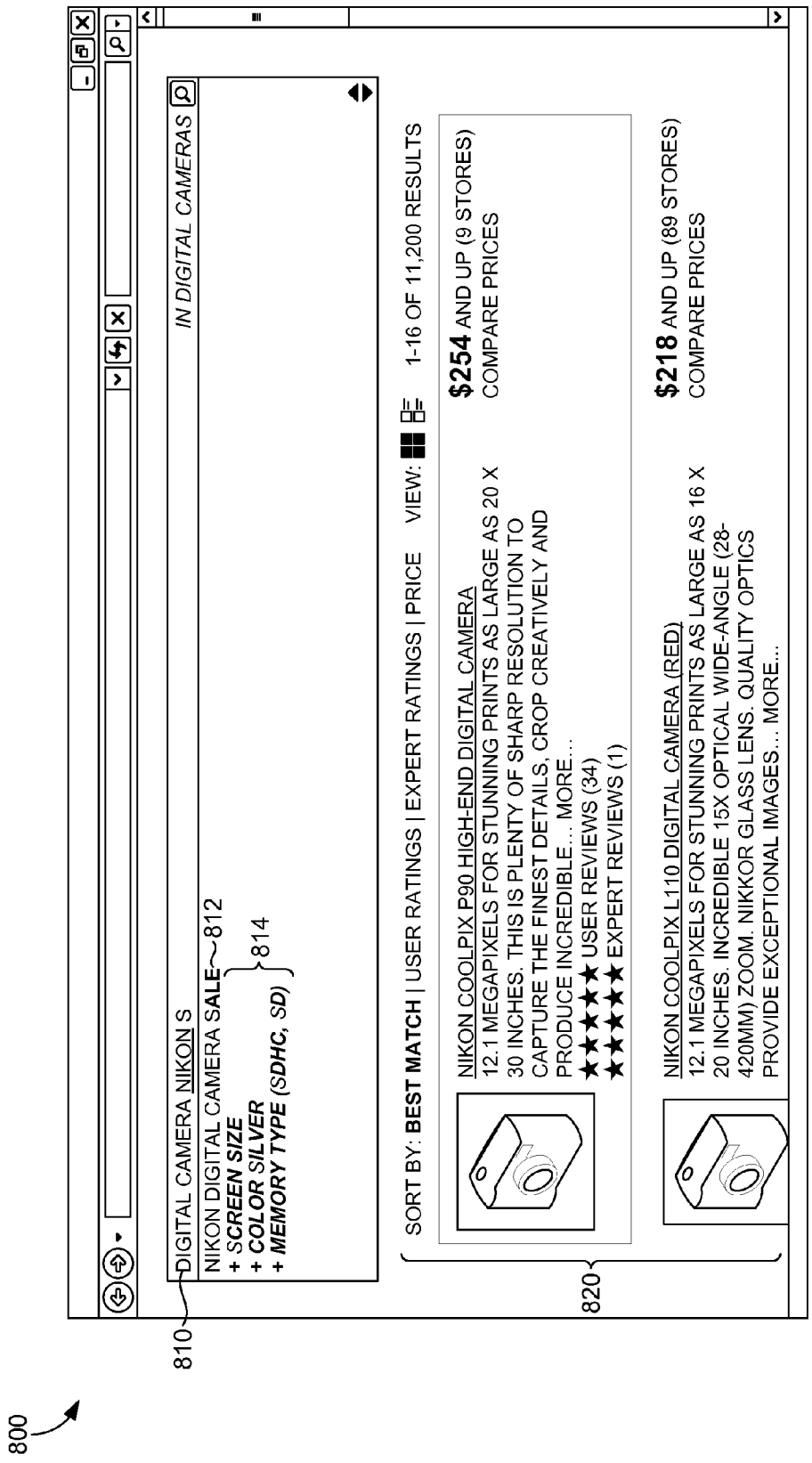

FIG. 8 illustrates another screen display of a user interface 800, in accordance with an embodiment of the present invention. The user has now entered the letter "s" onto the end of the search query 810. In one embodiment, both the query completion suggestions and the query formulation suggestions, which here are attribute suggestions, are filtered based on the letter "s." For example, because "sale" begins with "s," the only query suggestion 812 displayed is "Nikon digital camera sale." Here, a lexical prefix match may not be performed, but instead a semantic prefix was applied where it has been identified that "digital camera Nikon" is equivalent to "Nikon digital camera." Additionally, only the attribute suggestions associated with the letter "s" or those attribute suggestions having attribute value suggestions associated with the letter "s" are displayed at this point. Here, the attribute suggestions 814 include "screen size," "color silver," and "memory type (SDHC, SD)." Again, these lists are dynamic such that each time the query is modified, both the query completion suggestions 812 and the query formulation suggestions, or attribute suggestions 814, are filtered, and thus are also modified. In one embodiment, only the attribute suggestions are filtered and attribute value suggestions are not included. But, as shown in the embodiment of FIG. 8, the attribute suggestions and attribute value suggestions for each attribute are filtered such that if the user is actually wanting to search for Nikon SD cards, that is easily found.

Figure 9:
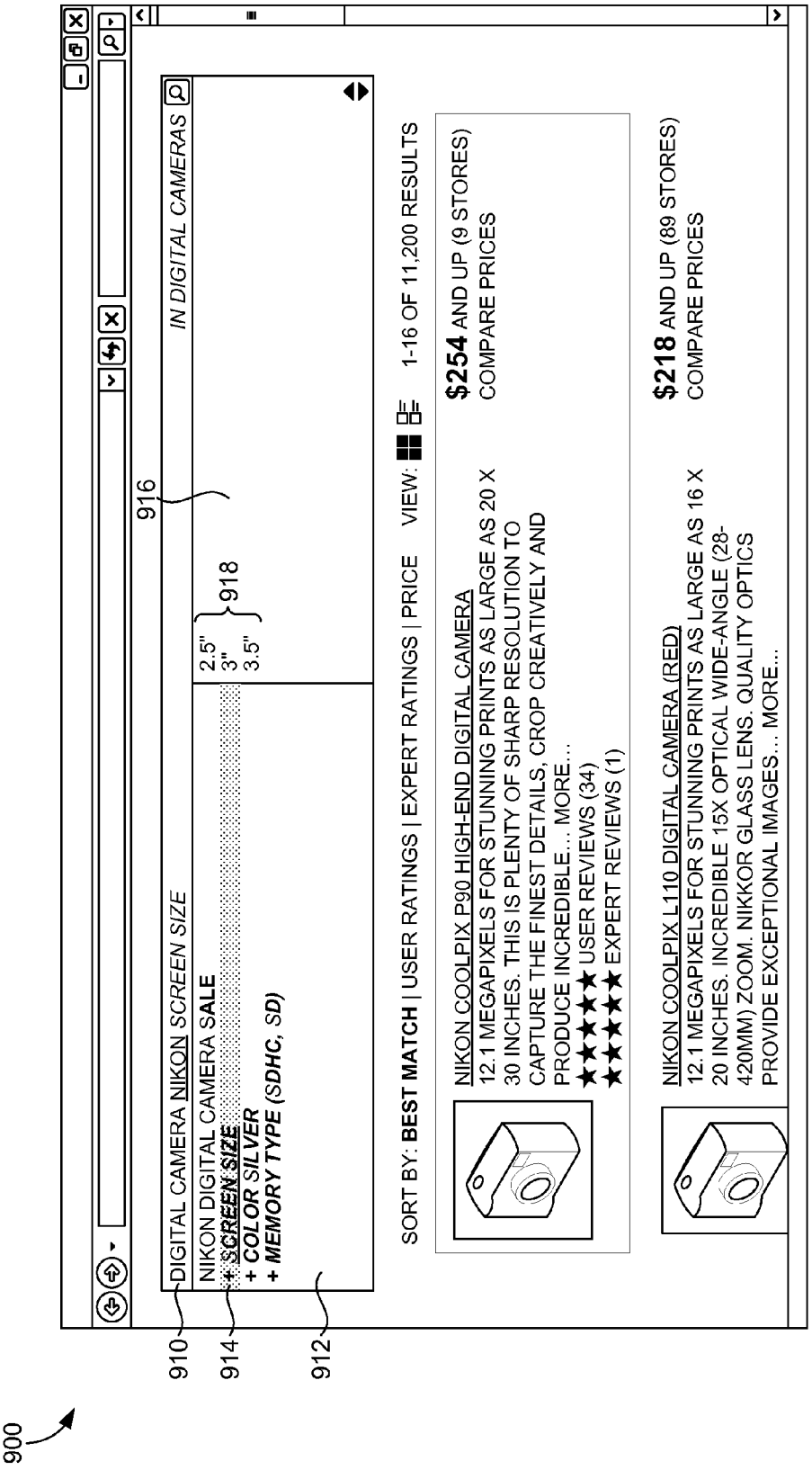

FIG. 9 illustrates another screen display of a user interface 900, in accordance with an embodiment of the present invention. Continuing from FIG. 8, the user has selected the "screen size" attribute 914 in the suggestion area 912. As a result, "screen size" has been added to the query, but as shown, it is visually different (e.g., italics, underline, bold) than the rest of the query. This is because it is not actually being added to the query, but indicates that the user may select one of the attribute value suggestions 918 from the list in the attribute value display area 916. It should be noted that the attribute value suggestions of screen size, in this case, are associated specifically with Nikon brand digital cameras, not any other brand, as the user as already selected "Nikon" as the brand to add to the search query. This is because the query has been refined to be specific to Nikon cameras, and as such associated entities would all be Nikon products. As such, if a different brand would have been chosen in FIG. 6, the associated entities would also be different, and thus the screen sizes shown in FIG. 9 would be different, as they would be customized to the particular brand. As such, attribute value suggestions, even those that are associated with the same attribute, are dynamic in that they vary based on the entity(s) best corresponding to the current formulation of the search query.

Figure 10:
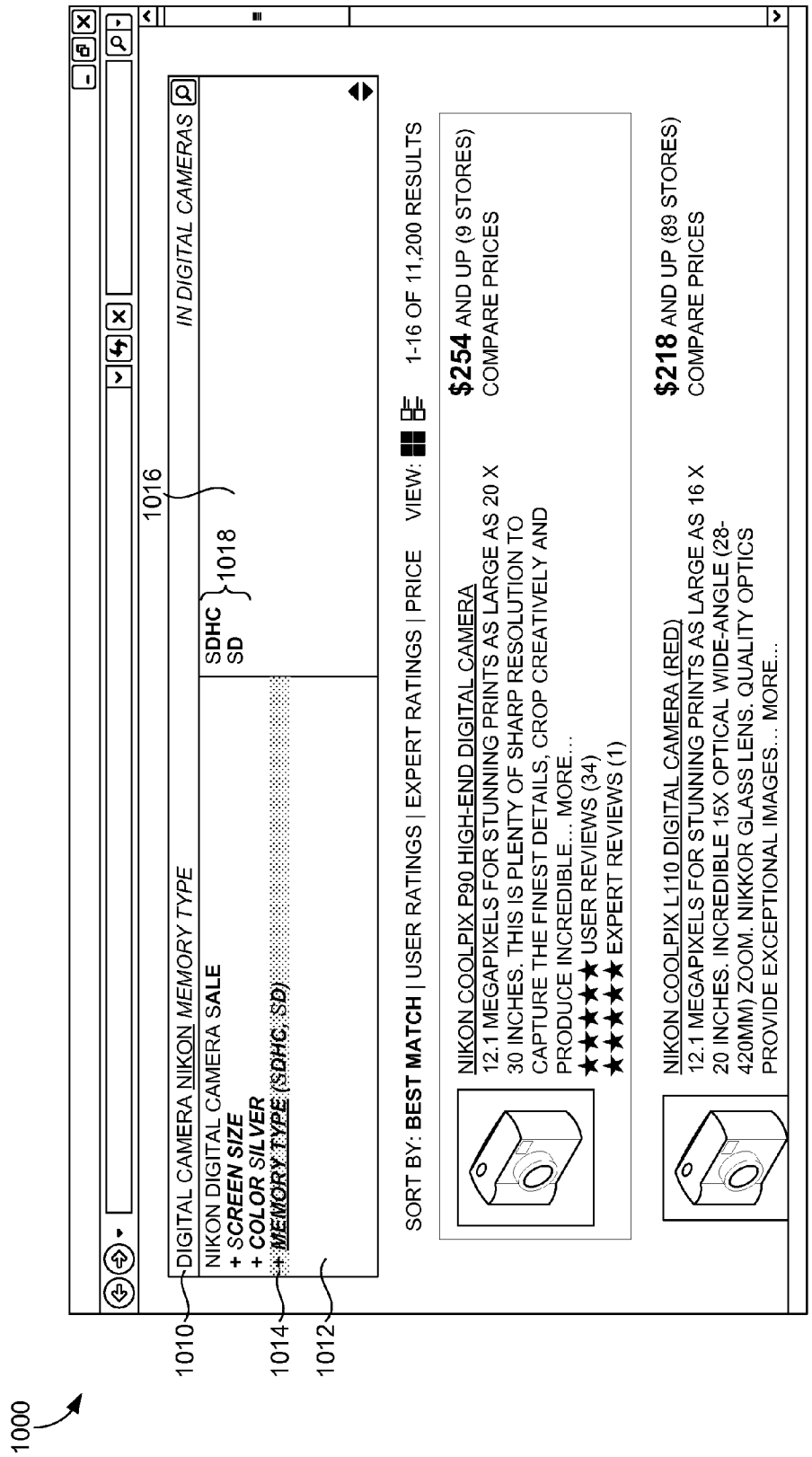

FIG. 10 illustrates another screen display of a user interface 1000, in accordance with an embodiment of the present invention. In the embodiment of FIG. 10, the user has selected (e.g., clicked, hovered, enter key) the "memory type (SDHC, SD)" attribute/attribute value 1014 in the suggestion box 1012. As mentioned, this attribute/attribute value 1014 is displayed as a result of the user adding "s" to the end of the search query in FIG. 8. When the user selects "memory type (SDHC,SD)," the attribute value suggestions 1018 are displayed in attribute value display area 1016. "Memory type" is added to the search query 1010, but is visually distinct from the rest of the query to indicate that it isn't actually part of the query, but that the user has the option to select an attribute value associated with the "memory type" attribute.

Figure 11:
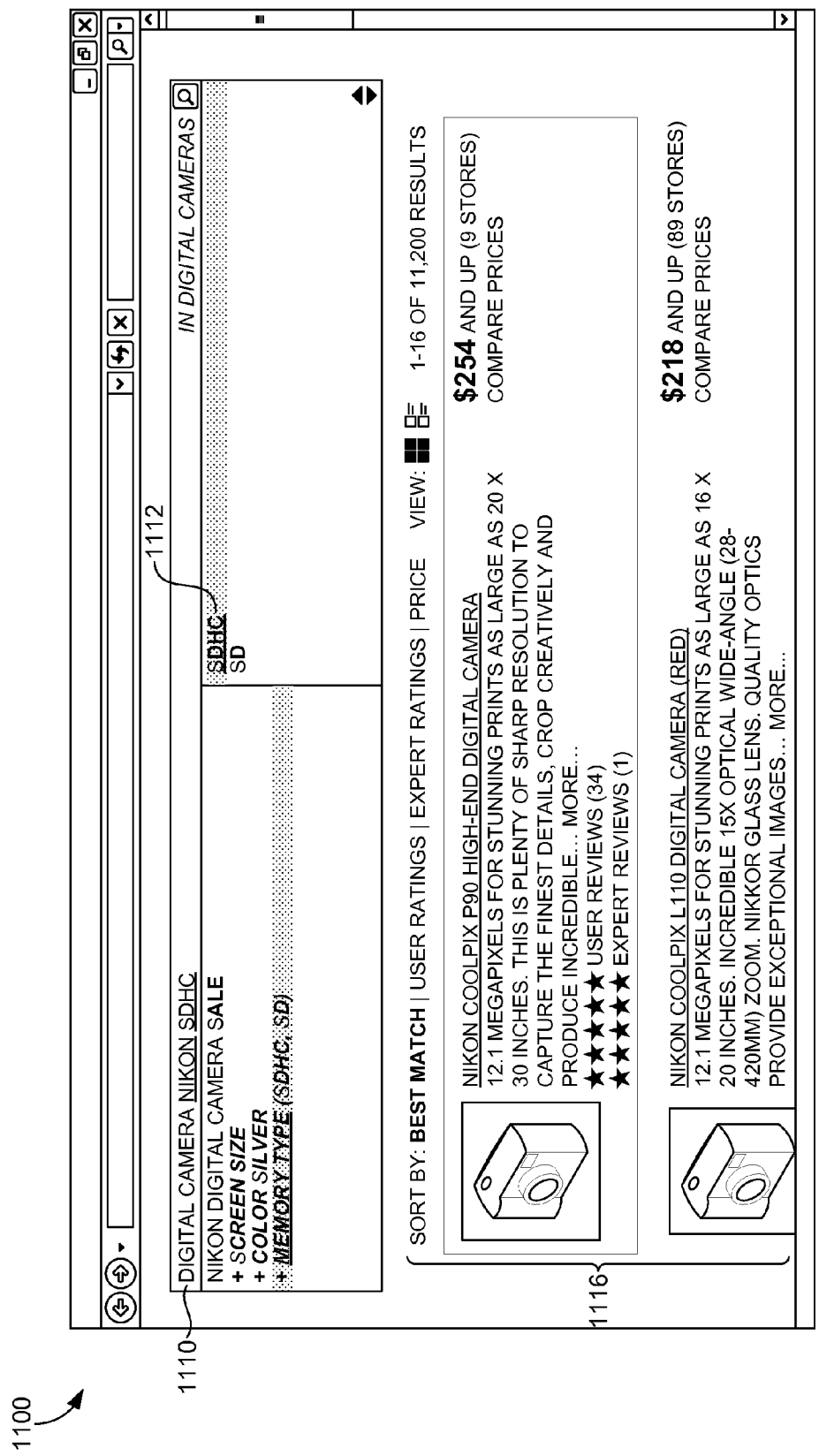
Figure 12:
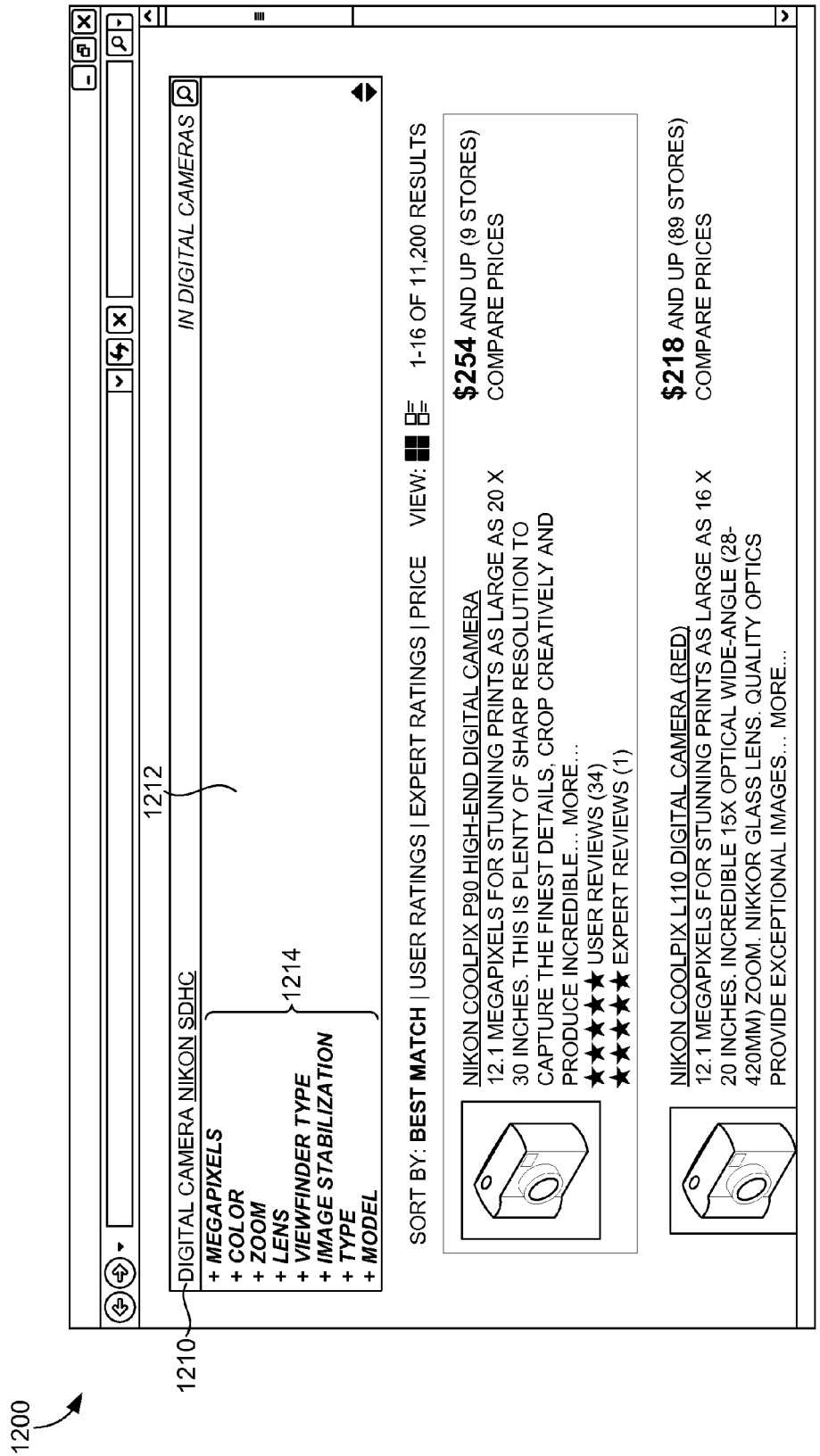

FIG. 11 illustrates another screen display of a user interface 1100, in accordance with an embodiment of the present invention. Continuing from FIG. 10, the user has now selected the "SDHC" attribute value 1112 in the suggestion area. As shown, the search query 1110 has now been modified to add the selected "SDHC" attribute value 1112 selected by the user. Here, the selection, in one embodiment, may be actually pressing the enter key on a keyboard or using a mouse click to indicate that the user wants that attribute value to be part of the search query. "Memory type" is no longer shown in the search query, as an attribute value has now been selected. In one embodiment, the search results 1116 are updated at this point, as a semantic boundary has been reached (e.g., a term or terms have been added to the search query). Continuing from FIG. 11, FIG. 12 illustrates that the user has now selected "SDHC" attribute value, and it has been added to the search query 1210. Now, a list of attribute suggestions 1214 that have not already been selected or used by the user to formulate the query is displayed in the suggestion area 1212. It can be seen that "memory type" and "brand" are not in the list of attribute suggestions 1214, although they previously were in the list.

Figure 13:
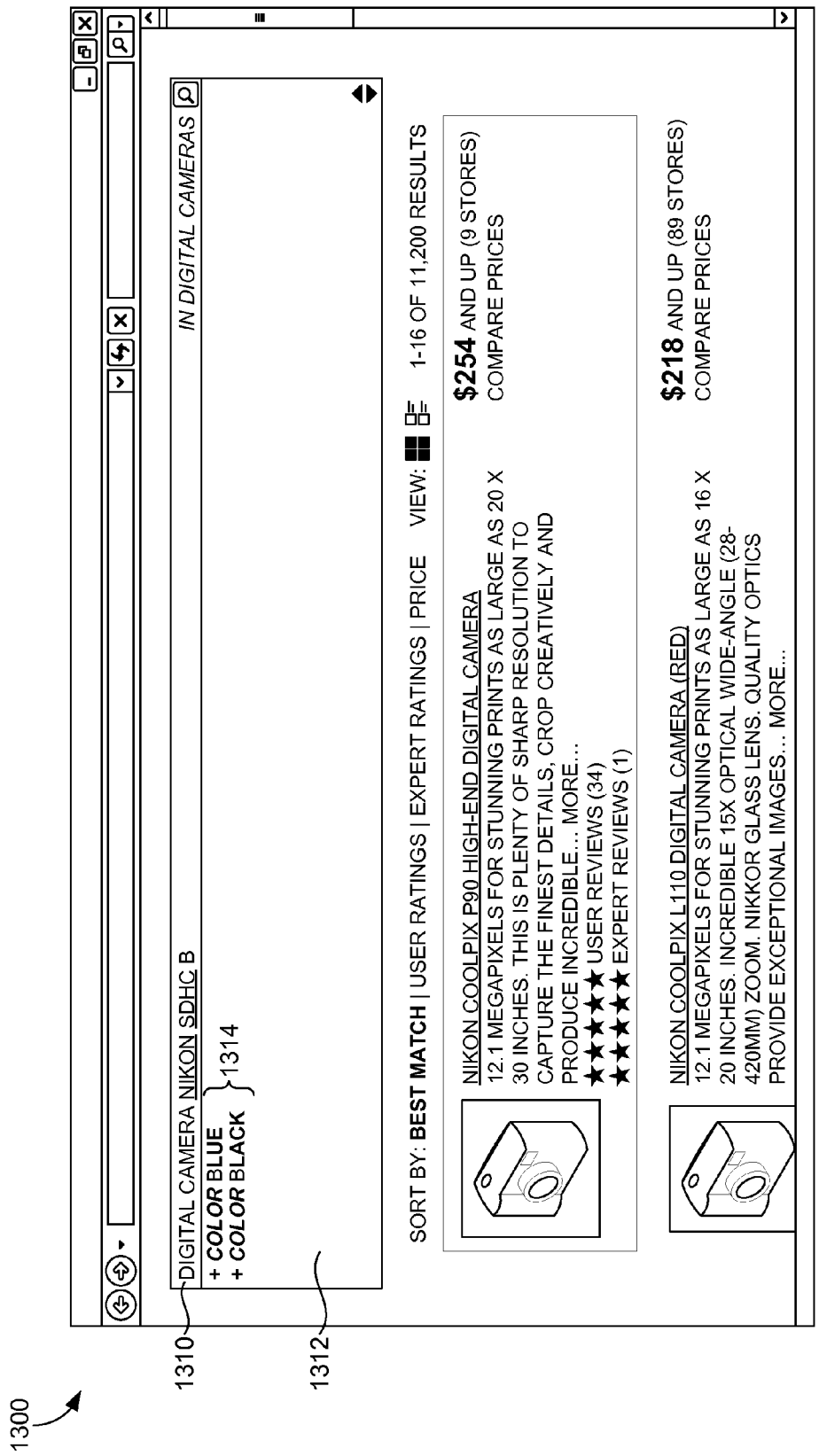
Figure 14:
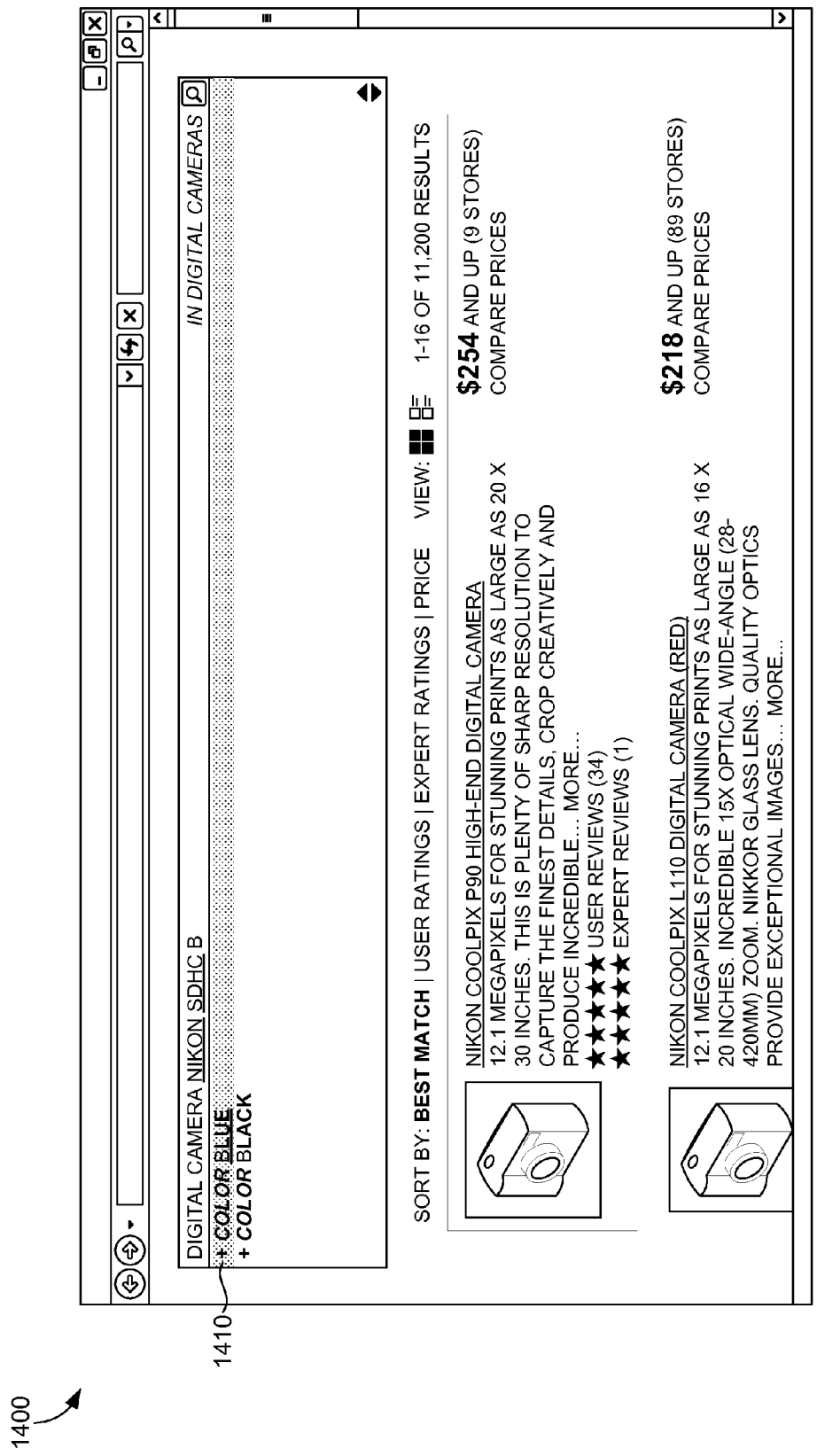
Figure 15:
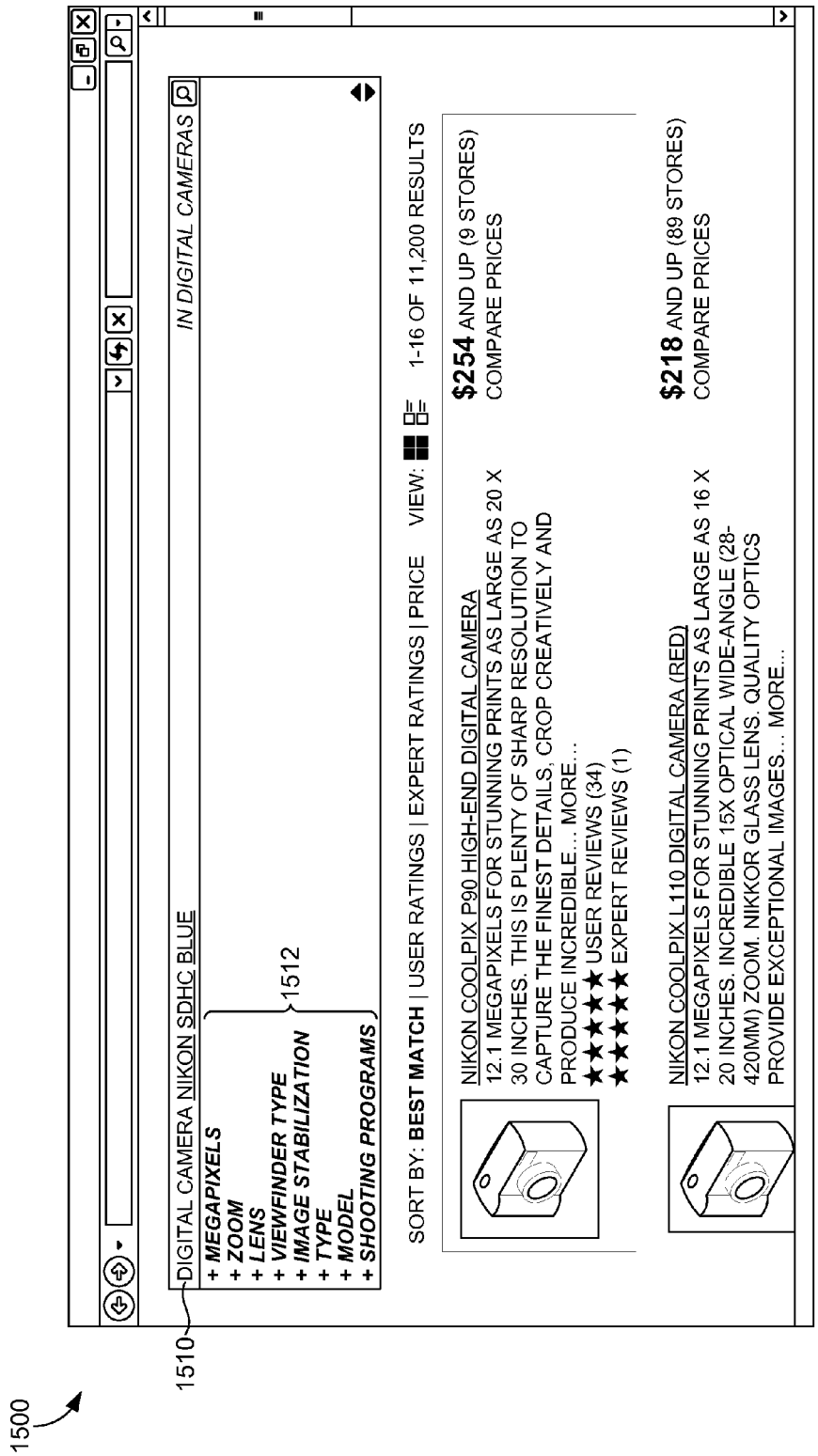

FIG. 13 illustrates another screen display of a user interface 1300, in accordance with an embodiment of the present invention. Similar to that shown and described with respect to FIG. 8, the user has now entered "b" into the search box at the end of the search query 1310. The attribute suggestions and attribute value suggestions are filtered to display only those associated with the letter "b." In this case, two colors, blue, and black, start with "b," and thus are shown in the attribute/attribute value list 1314 in the suggestion area 1312. As shown in FIG. 14, the user interface, generally referred to as 1400, illustrates that the user has selected the "color blue" attribute/attribute value 1410. In FIG. 15, the user interface, generally referred to as 1500, illustrates that the search query 1510 now includes the word "blue," as this was selected by the user. The list of attribute suggestions 1512 is now different, as "color" is no longer an option because the user has already selected the color blue to further define the search query 1510.

Figure 16:
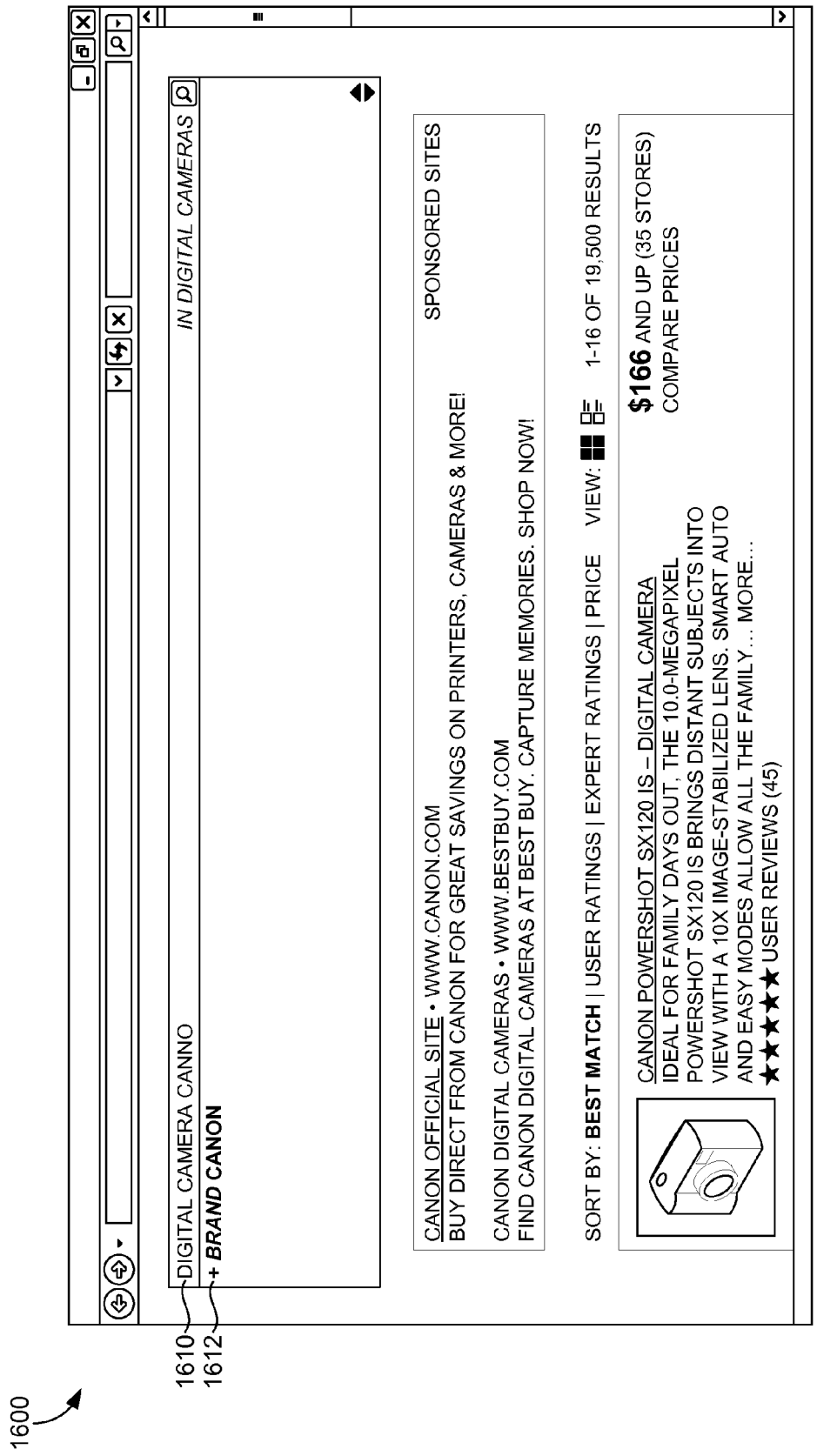

FIG. 16 illustrates another screen display of a user interface 1600, in accordance with an embodiment of the present invention. In FIG. 16, the search query 1610 is "digital camera canno" where the brand "Canon" has been incorrectly spelled by the user. In a circumstance where a term in the query is spelled incorrectly, embodiments of the present invention can be used to assist the user in understanding the user's actual intent. For instance, the attribute/attribute value suggestion 1612 "brand Canon" may be suggested to the user in the suggestion box as being an option that the user may choose to select, which would correct the spelling in the search query.

In one embodiment, while the user may initially enter the search query "digital camera" and eventually add more attribute values to the search query using the methods described herein, the system may reformulate or paraphrase the search query for the user as more information is added. So instead of "digital camera Nikon," the system may reformulate it to read "Nikon digital camera," which likely appeals more to the user as it is in a natural language format. Not only may the query be reformulated in the search box, but it may also be in reformulated format on the search results page.

FIG. 17 illustrates an alternative embodiment than the embodiments described above, and depicts another screen display of a user interface 1700. In FIG. 17, the search query 1710 is "digital camera." Query completion suggestions 1712 and query formulation suggestions, including attribute/attribute values 1714, are displayed in the suggestion box. But in the embodiment of FIG. 17, the attribute suggestions are not listed separately from the attribute value suggestions. For instance, instead of just listing "brand" in the list of attribute suggestions and not displaying its corresponding attribute value suggestions until "brand" is selected by the user, here the user can see a sampling of the attribute value suggestions associated with each attribute. So "brand" becomes "brand (Canon, Nikon, . . . )." The others are similar, and are shown in the list of attribute/attribute values 1714. In one embodiment, the attribute value suggestions that are ranked highest or that are top values for each attribute are those that are shown in the list of attribute suggestions/attribute value suggestions 1714.

FIG. 18 illustrates yet another alternative embodiment of a screen display of a user interface 1800, in accordance with an embodiment of the present invention. Here, an attribute 1814 "brand" has been selected, and an attribute value 1818 "Canon" has been selected from the list of attribute value suggestions 1816. The search query 1810 now includes "brand Canon" 1812. "Brand Canon" 1812 is not actually added to the query, but "Canon" is. The user may select the word "Canon" from the search query 1810 which results in a dropdown list of alternative brands of digital cameras. This may be easier for a user to change an attribute value than going through the process of selecting the attribute and selecting the desired attribute value. This same embodiment could be used with other attribute suggestions. In addition to the visual representation of the attribute and selected attribute value in the search box in FIG. 18, other visual representations are also contemplated to be within the scope of the present invention, including just the display of the attribute value in a visually distinct way such that the user would know that he or she may select (e.g., hover, mouse click) over that attribute value to change it to a different attribute value.

Figure 19:
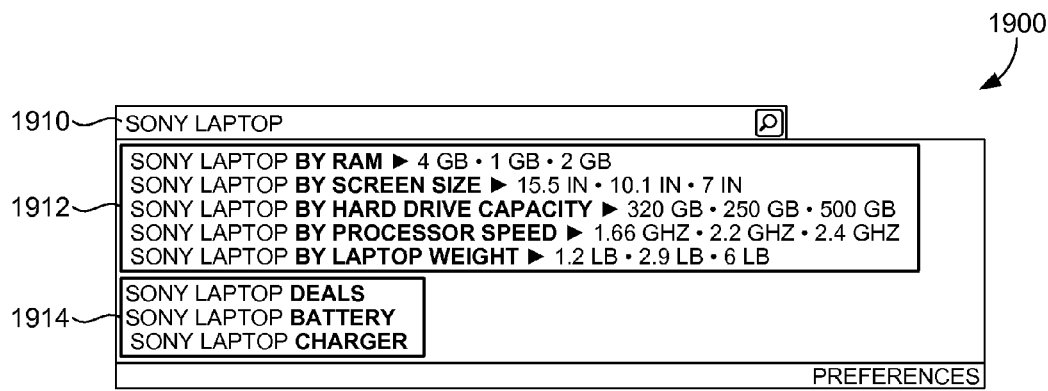
Figure 20:
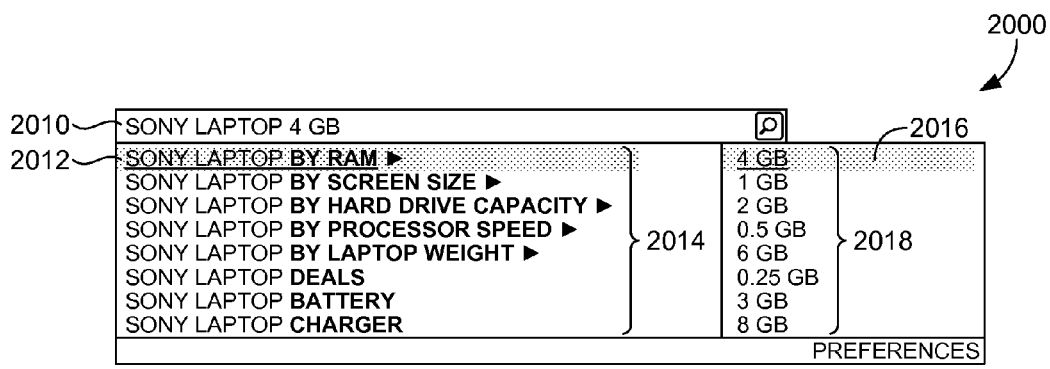

FIGS. 19-22 illustrate progressive screen displays of user interfaces (1900, 2000, 2100, and 2200), in accordance with embodiments of the present invention. In FIG. 19, a search query 1910 of "Sony laptop" has been entered by a user. In response to this search query, the system determines whether there are any entities in the entity store, such as entity store 206 in relation to FIG. 2, that are associated with the inputted search query. Entities are identified if the system has a high enough confidence as to what the user is searching for. If one or more entities are identified, query formulation suggestions, including attribute/attribute value suggestions 1912 and query completion suggestions 1914 are transmitted for presentation on the user interface 1900. FIG. 19 illustrates an embodiment different from those previously discussed in that it lists various attribute suggestions with a few selected (e.g., most relevant, most popular) attribute value suggestions to give the user an idea of values associated with each attribute. As shown in FIG. 20, the user has selected (e.g., mouse hover) the "Sony laptop by RAM" attribute 2012 from the list of attribute suggestions 2014. Based on this selection, a list of attribute value suggestions 2018 associated with the selected attribute value 2012 is displayed. The user has selected the "4 GB" attribute value 2016 from the list of attribute value suggestions 2018. Since an attribute value has been selected, the selected attribute value, "4 GB," is added to the search query 2010. In one embodiment, since a semantic boundary has been reached, the search results would be updated to reflect the additional information in the search query.

Figure 21:
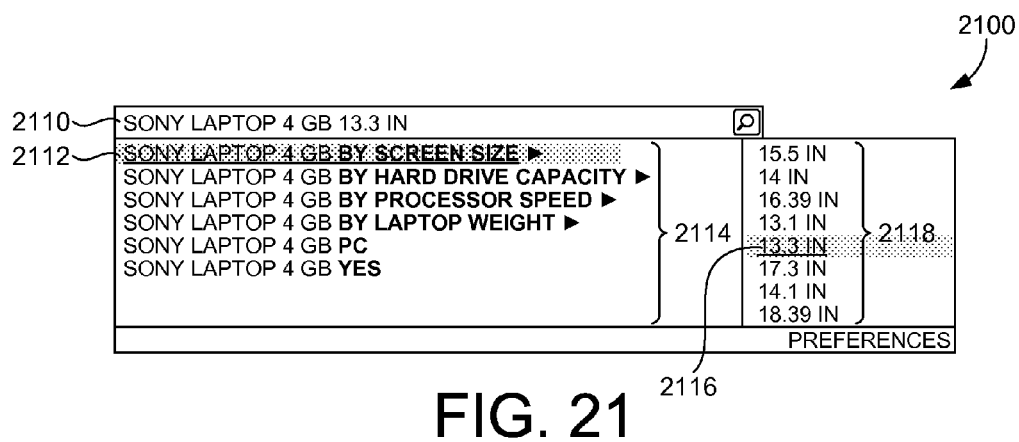
Figure 22:
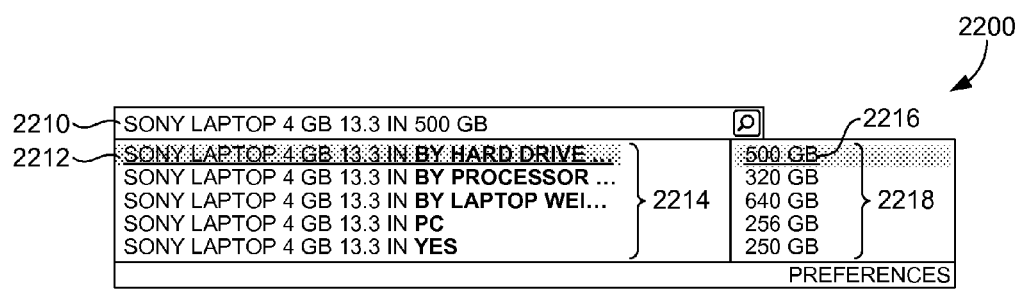

FIG. 21 illustrates that a new and filtered list of attribute suggestions 2114 are displayed based on the user's previous selection of the "4 GB" RAM size. "RAM" is no longer an option in the attribute suggestions 2114. Now, the user has selected to further define the search query 2110 by screen size, as indicated by the user's selection of the attribute 2112 "Sony laptop 4 GB by screen size." Note that in this embodiment, the current search query is included before each listed attribute. In other embodiments, the current search query may not be included in the listing of attribute suggestions, as shown in previous figures herein. Based on the user selection of the "screen size" attribute 2112, a list of attribute value suggestions 2118 is displayed. The user has chosen to select the "13.3 in" attribute value 2116, which is then added to the search query 2110. In FIG. 22, an updated list of attribute suggestions 2214 is presented to the user on the user interface 2200. As mentioned, the updated list does not include previously-selected attribute suggestions for which the user has actually selected an attribute value that has been added to the query. As such, the lists of both attribute suggestions and attribute value suggestions are dynamic. The user has now selected the attribute "hard drive" 2212 from the list of attribute suggestions 2214. As a result, a list of attribute value suggestions 2218 are displayed, and the user has selected the "500 GB" attribute value 2216. "500 GB" has been added to the search query 2210.

FIGS. 23-26 illustrate various embodiments of screen displays of user interfaces (2300, 2400, 2500, and 2600) for providing attribute and attribute value suggestions based on a ambiguous search query. FIG. 23 illustrates a search query of "inte" 2310. The system may be unsure of the user's intent, but can display query completion suggestions 2314 and query formulation suggestions, comprising attribute suggestions, that are thought to match the user's intent. Additionally, category suggestions 2312 may also be provided, as shown in FIG. 23. Initially, the system finds the top completions for "inte" and then determines that the top completion "intel" is ambiguous. Because "intel" is ambiguous, the system may guess as to which categories the query could fit into and list the top categories from which the user may choose. Here, it is thought that the user is trying to search for Intel, and thus categories associated with Intel are displayed. This allows the user to accurately choose the direction in which the search will proceed (e.g., whether the user wants to search for CPUs or motherboards. FIG. 24 illustrates an alternative embodiment. Here, the user has selected "Intel in CPUs" 2412 as the category. Other categories 2414 not selected by the user are shown in a different portion of the suggestion area so that the user can choose a different category if "CPUs" is not the correct one. Query completion suggestions 2416 are also displayed. The query 2410 has not been modified yet, as an attribute value has not been selected. Further, the selected category is displayed in the search box.

FIG. 25 illustrates an alternative embodiment in that the user has selected the category "CPUs" 2512, and alternate categories may be browsed by using the left and right arrow buttons 2514. Here, CPUs may be the top category, and as such it is the category that is displayed with the others hidden from view. There are many other ways that this type of information can be displayed for user selection, and are contemplated to be within the scope of the present invention. For example, the user may be able to select (e.g., hover) over the category name in the search box such that alternative categories would appear in a dropdown box. Or, arrows may be displayed next to the category name in the search box that allow the user to browse alternative categories. FIG. 26 illustrates how ambiguous interpretations may be handled. Here, the query is "gold watch" 2610. Ambiguous attribute suggestions may be provided, as shown here. "Material: gold" is the best interpretation of the query. As such, the attribute suggestion of "material: gold" 2612 is displayed in the suggestion area, and as shown, has been selected by the user as illustrated by the shading.

Figure 27:
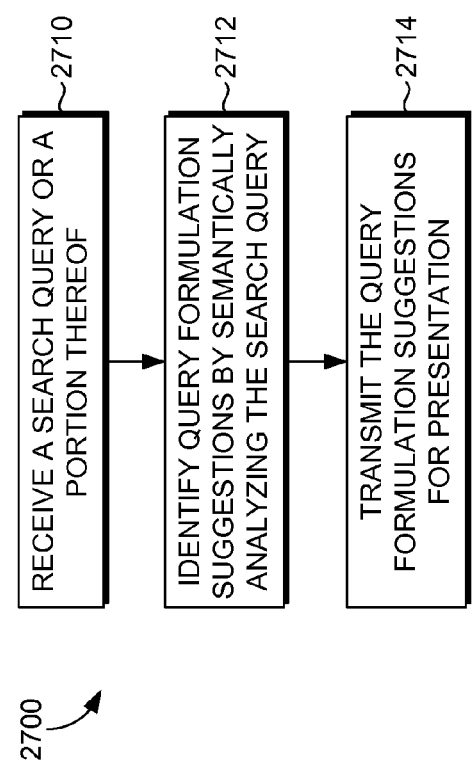

Turning now to FIG. 27, a flow diagram is shown of a method 2700 for identifying query formulation suggestions in response to receiving a search query, in accordance with an embodiment of the present invention. Initially, a search query or a portion thereof is received at step 2710 in a search query box, such as that illustrated in previous figures herein. The search query box may receive and display the user's search query. In embodiments, the search query entered by the user is not a complete search query, as the system described herein assists the user to complete the search query based on the user's true intent to find an answer by way of search results. At step 2712, query formulation suggestions are identified by semantically analyzing the received search query or portion thereof. Query formulation suggestions comprise semantic-pattern-based query suggestions that are derived from semantic query patterns and entities and/or information associated with the entities. For instance, the search query may be semantically analyzed to identify one or more entities associated with the search query. As the search query may be a partial query, the system uses semantic analysis techniques to identify entities that are most likely what the user is searching for. In some instances, more than one entity is identified, such as more than one product corresponding to the search query "digital came." In one embodiment, a query formulation suggestion is selected as being most relevant to the search query, and the information (e.g., categories, attributes, attribute values) corresponding to the entities associated with the completion is presented to the user. In embodiments, the entity store is used to generate query formulation suggestions that complete the potentially incomplete query, where each of the query formulation suggestions corresponds to at least one entity.

The query formulation suggestions may be generated based on the identified entities. The query formulation suggestions may include, for example, categories, attributes, and attribute values which assist the user to formulate the search query. The query formulation suggestions are transmitted for presentation at step 2714. As mentioned, query formulation suggestions may include categories, attributes, and attribute values. In some embodiments, there may not be any categories associated with an entity. In that case, no categories are presented to the user. But if any attributes or attributes values are known in relation to that entity, those may be presented to the user. The identified attribute suggestions may be displayed in a suggestion area, such as the suggestion area illustrated in various figures herein. In one embodiment, query-log-based query suggestions are also displayed in the suggestion area in addition to the attribute suggestions to provide the user with a blended experience that encompasses both query-log-based query suggestions (e.g., popular queries that have been submitted to the search engine in the past) and query formulation suggestions. The query formulation suggestions are configured to be selectable by a user. For instance, when the user selects a particular attribute value, such as "blue," the term "blue" is added to the search query to further define the user's intent.

Figure 28:
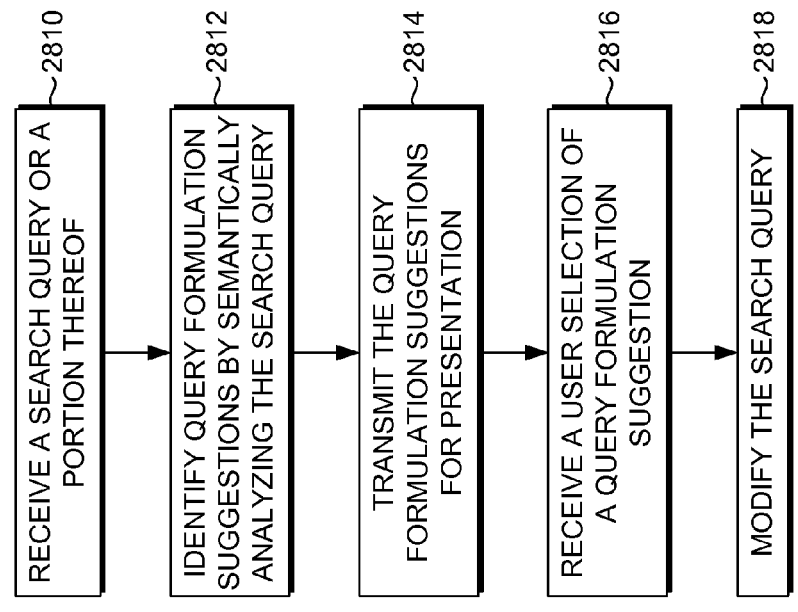
FIGS. 27-31 illustrate flow diagrams of methods for identifying query formulation suggestions in response to receiving search queries, in accordance with embodiments of the present invention.

Referring to FIG. 28, a flow diagram of a method 2800 for identifying query formulation suggestions in response to receiving a search query is illustrated, in accordance with an embodiment of the present invention. At step 2810, a search query is received, typically in a search box, which may both receive and display the search query. The search query entered by the user may not be a complete search query that clearly defines what the user is looking to find, but may be a partial search query. In one embodiment, the user may not press the search key or hit the enter key on a keyboard, but may still be typing when query formulation suggestions are displayed. At step 2812, query formulation suggestions are identified by semantically analyzing the search query or portion thereof.

Query formulation suggestions associated with the identified entities are identified, and may include category suggestions, attribute suggestions, attribute value suggestions, etc. Categories may include product types (e.g., digital camera, video camera, watches, party supplies, smart phones) or may even include non-products, such as locations, ideas, or the like. Generally, attributes are groups of different aspects corresponding to a particular entity that are found or known to be relevant to that entity. At step 2814, the query formulation suggestions are transmitted for presentation in, for example, a suggestion area, and are configured to be selected by a user to further formulate the search query. In one embodiment, the suggestion area is located on the user interface beneath the search box, but in other embodiments, is located in another location on the user interface.

A user selection is received of one of the query formulation suggestions at step 2816. This user selection may include a hard selection (e.g., pressing the enter key on the keyboard, mouse clicking the attribute) or a soft selection (e.g., hovering over the attribute). In one embodiment, the user selection of an attribute is a hover of the mouse over the attribute, which causes attribute value suggestions to be displayed, as discussed below. Once a user selection is made, the query is modified at step 2818 based on the selected query formulation suggestion.

Attribute values are simply values that correspond to the selected attribute. For example, an attribute of color would potentially have values including, for example, blue, green, orange, red, etc. Attribute values are selectable by the user and help to further define and formulate the user's search query. It should be noted that both attribute suggestions and attribute value suggestions are dynamic lists and change based on the current form of the user's search query, category, etc. For instance, attribute values for the attribute "color" are different based on whether the category is a laptop or a car. Laptops made by Dell, for example, likely do not come in the same colors as a particular vehicle. Likewise, laptops made by one manufactures may not come in the same colors as laptops made by another manufacture. Additionally, once a user has further defined the search query, the attribute associated with the additional term added to the search query may not be visible in the list of attribute suggestions, since the user has already made a decision based on that particular attribute.

Figure 29:
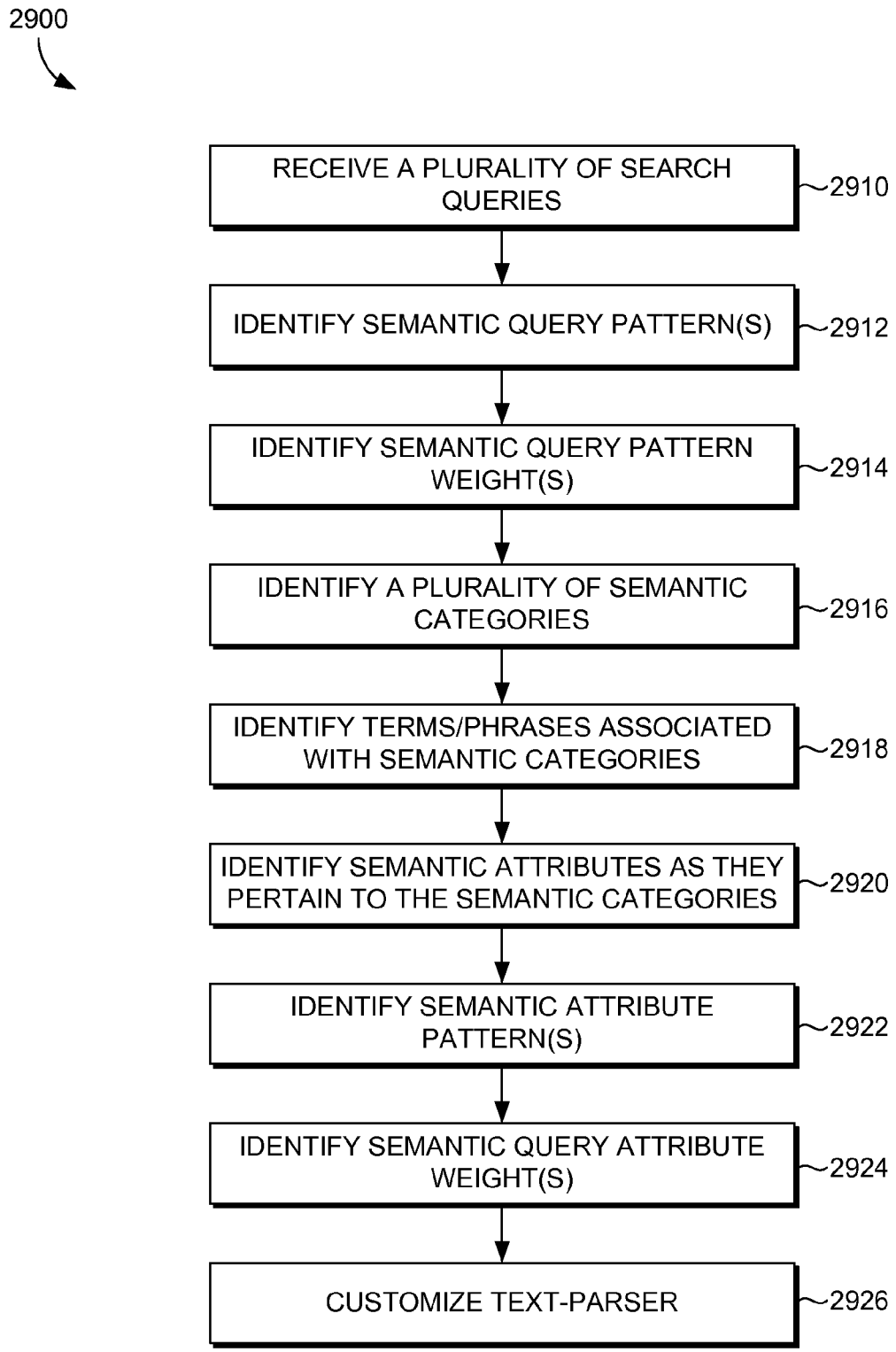

With reference now to FIG. 29, a method, referenced generally by the numeral 2900, is depicted, in accordance with an embodiment of the present invention. At step 2910, a plurality of search queries is received, for instance, from a query log. Each of the plurality of search queries is associated with a respective set of matching entities. At step 2912, at least one semantic query pattern is identified from the plurality of received search queries. A weight for each identified semantic query pattern is identified at step 2914. At step 2916, a plurality of semantic categories is identified, for instance, from an entity database (e.g., entity store 206 of FIG. 2). Each of the plurality of semantic categories is associated with a respective set of entities. At step 2918, at least one term or phrase (e.g., an n-gram) commonly associated with at least one of the semantic categories is identified. At step 2920, a plurality of semantic attributes as they pertain to the plurality of semantic categories is identified. At least one semantic attribute pattern is identified from the plurality of semantic attributes at step 2922. At step 2924, a weight for each identified semantic attribute pattern is identified. At step 2926, a text-parser is generated or customized from the at least one semantic query pattern and respective weights, the at least one semantic category term or phrase and respective weights, and the at least one semantic attribute patterns and respective weights.

The text-parser may be utilized in parsing input user queries or portions thereof, in accordance with embodiments herein above described. In one embodiment in this regard, at least a portion of an input user search query is received, the text-parser is applied to determine at least one likely attribute for expansion of the input user query, the likelihood being based upon the respective weights, and the at least one likely attribute is transmitted for presentation as an attribute suggestion. In embodiments, applying the text-parser to determine at least one likely attribute for expansion of the input user query may comprise applying the text-parser to determine a plurality of likely attributes for expansion of the input user query, each of the plurality of likely attributes having a calculated weight associated therewith. In embodiments, transmitting the at least one likely attribute for presentation as an attribute suggestion may comprise transmitting at least a portion of the plurality of likely attributes for presentation as attribute suggestions, the attribute suggestions representing the plurality of likely attributes or portion thereof that are transmitted for presentation being arranged in an order representing their respective calculated weights.

As can be seen, embodiments of the present invention provide for systems, methods and computer-storage media having computer-usable instructions embodied thereon, for building, linking, and exposing semantic knowledge of a search system or systems (e.g., query logs, facets, relationships of entities from structured and unstructured data, contextual signals, and the like) to assist users in query formulation and intent disambiguation, as well as query formulation. Embodiments of the invention may be scaled to tail and never-seen queries and can provide better user intent signals to the system for result matching and lead to better and more relevant search results.

Figure 30:
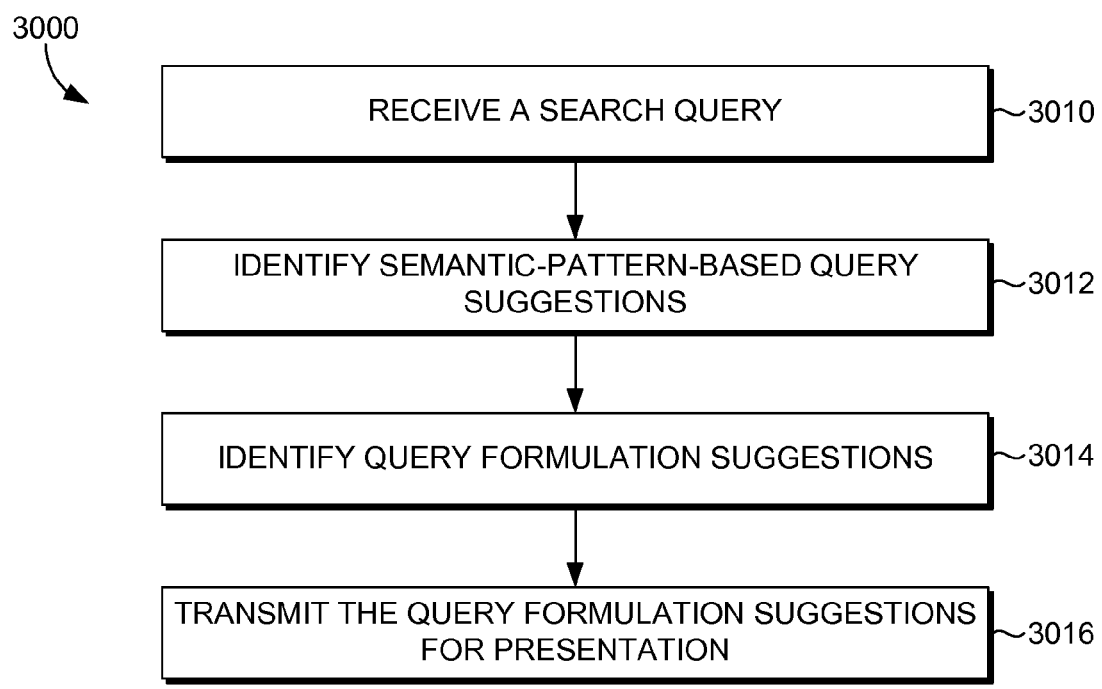

FIG. 30 illustrates a flow diagram of a method 3000 for identifying query formulation suggestions in response to receiving a search query, in accordance with an embodiment of the present invention. At step 3010, a search query or a portion thereof is received. At step 3012, semantic-pattern-based query suggestions are identified by semantically analyzing the received search query. The semantic-pattern-based query suggestions are derived from semantic query patterns, entities, and information associated with the entities. The information includes attributes and attribute values such that the entities are used to identify the semantic-pattern-based query suggestions. The attribute suggestions and attribute value suggestions are configured to be selectable by a user to further formulate the search query. At step 3014, a set of the query formulation suggestions are identified to transmit for presentation. At step 3016, the set of query formulation suggestions are transmitted for presentation. These suggestions are configured to be selectable by a user to formulate the search query.

Figure 31:
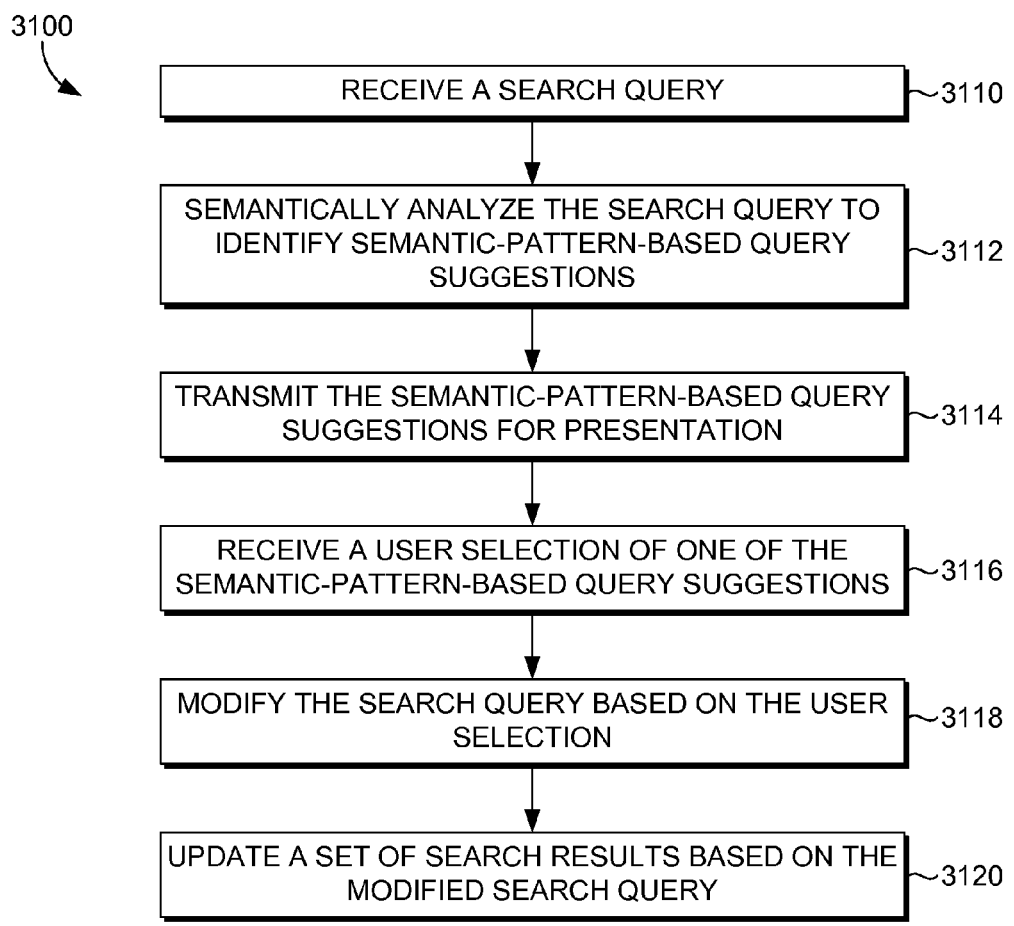

Turning now to FIG. 31, a flow diagram of a method 3100 is illustrated for identifying query formulation suggestions in response to receiving a search query, in accordance with an embodiment of the present invention. At step 3110, a search query or a portion thereof is received. The search query is semantically analyzed at step 3112 to identify semantic-pattern-based query suggestions that are generated by semantic query patterns, one or more entities, or information associated with the entities. The information may include categories, attributes, attribute values, etc. The semantic-pattern-based query suggestions are transmitted for presentation at step 3114, and are configured to be selectable by a user to formulate the search query. At step 3116, a user selection of one of the semantic-pattern-based query suggestions is received. In response to the user selection, the search query is modified at step 3118 based on the selected semantic-pattern-based query suggestion. At step 3120, a set of search results is updated based on the modified search query. This indicates that a semantic boundary has now been reached.

Figure 32:
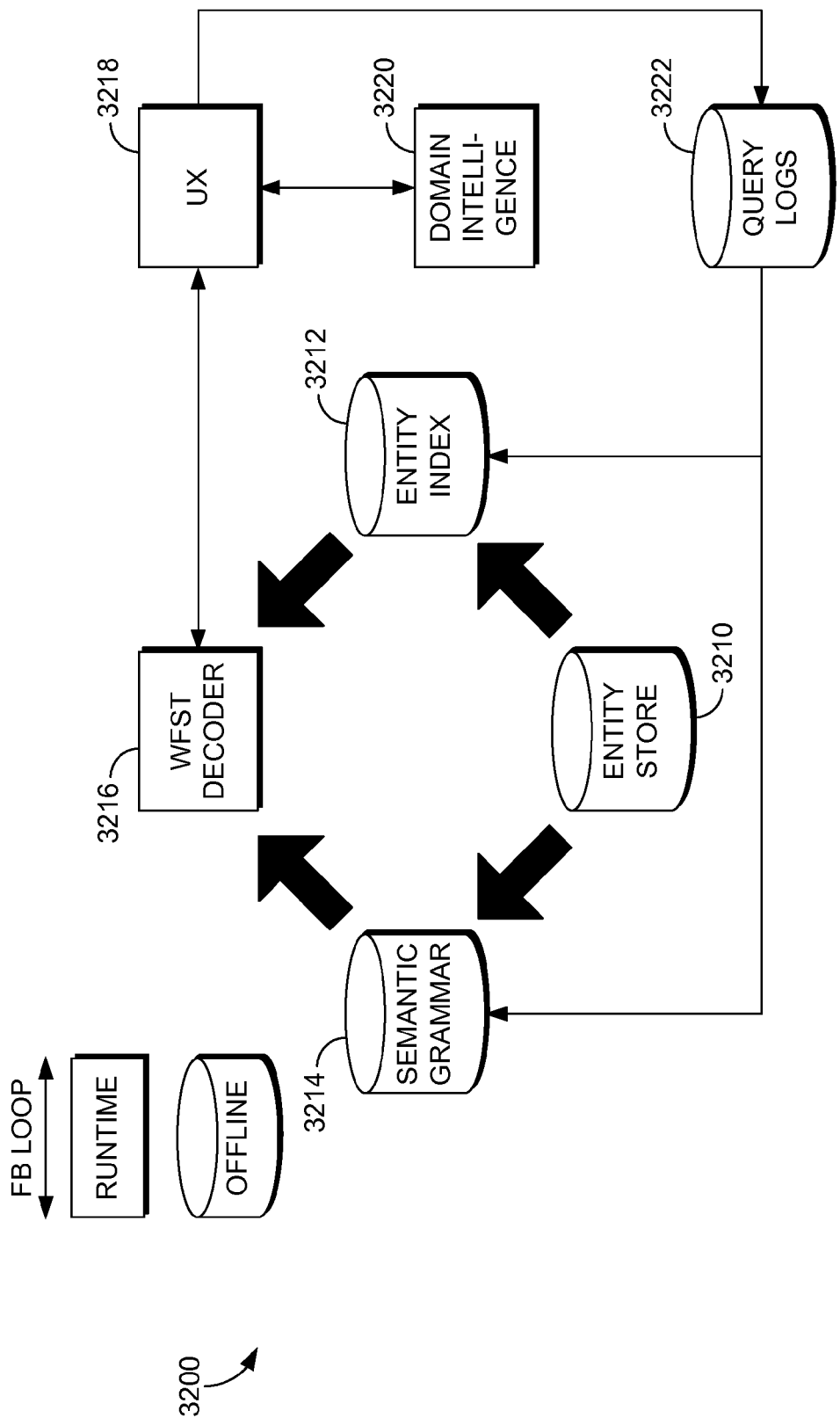
FIG. 32 illustrates a block diagram of an exemplary system in which embodiments of the invention may be employed.

Turning now to FIG. 32, a block diagram is illustrated of an exemplary system in which embodiments of the invention may be employed. The entity store 3210, as previously mentioned, stores entities and known information associated with entities. For instance, one or more of categories, attributes, or attribute values may be stored in the entity store 3210 in association with an entity. From the entity store 3210, various files are generated, including an entity index 3212 and a semantic grammar file 3214. The semantic grammar file 3214 predicts what the user will or wants to type, and additionally stores query patterns received from users along with attributes for each product category. It also stores previously observed queries along with their top interpretations. Further, the semantic grammar file 3214 stores templates that are used to generate query formulation suggestions, such as query templates, attribute templates, attribute value templates, category templates, and the like. The entity index 3212 stores an indexed representation of the entities stored in the entity store 3210. These files are sent to a weighted finite state transfuser (WFST) decoder 3216. The decoder receives notifications that the user has pressed a key, had a mouse click/event, etc. Every user event is considered by the decoder. From the decoder, the user experience (UX) component 3218 presents the query formulation suggestions to the user. The UX component 3218 interacts with the domain intelligence component 3220, which is responsible for refreshing search results when a semantic boundary is reached. The domain intelligence component 3220 retrieves updated search results for presentation to the user. The query log database 3222 receives entered queries, user selections, etc. for recording purposes. As shown in FIG. 32, the cylindrical components are able to be calculated offline, or prior to receiving a search query. The rectangular components perform their respective functions online, or once the search query is entered by a user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method performed by a computing device having a processor and a memory for identifying query formulation suggestions in response to receiving a portion of a search query, the method comprising:
    receiving the portion of the search query;
    identifying one or more query formulation suggestions by:
    A) accessing a database of semantic query patterns that are linguistic patterns contained in received queries,
    B) accessing an entity data store comprising one or more entities or information associated with the one or more entities, and
    C) using the database of semantic query patterns and the entity data store, identifying the one or more query formulation suggestions based on
        i) identifying a first semantic query pattern that corresponds to the portion of the search query,
        ii) identifying one or more entities or information in the entity data store that correspond to the first semantic query pattern, and
        iii) extracting specified attribute values by tagging words in the portion of the search query received from a user with their respective attributes; and
    transmitting the one or more query formulation suggestions for presentation.

2. The method of claim 1, wherein the first semantic query pattern corresponds to the portion of the search query.

3. The method of claim 2, wherein the semantic query patterns are templates.

4. The method of claim 1, further comprising identifying one or more categories associated with the identified one or more entities or information in the entity data store, wherein the one or more query formulation suggestions include the identified one or more categories.

5. The method of claim 1, wherein the first semantic query pattern matches the at least one of the one or more entities stored in the entity store.

6. The method of claim 5, further comprising transmitting the first semantic query pattern for presentation as the one or more query formulation suggestions.

7. The method of claim 1, further comprising, determining a second semantic query pattern that does not match any of the entities in the entity store.

8. The method of claim 7, further comprising not transmitting the second semantic query pattern that does not match any of the entities in the entity store as the one or more query formulation suggestions.

9. The method of claim 1, further comprising receiving an indication that the user has selected one of the one or more query formulation suggestions.

10. The method of claim 9, further comprising modifying the portion of the search query according to the user selection of the one of the one or more query formulation suggestions to generate a modified search query.

11. The method of claim 10, further comprising semantically analyzing the modified search query to identify one or more modified query formulation suggestions that comprise modified semantic-pattern-based query suggestions that are derived from the semantic query patterns and the at least one of one or more entities or the information associated with the one or more entities.

12. The method of claim 11, wherein the one or more modified query formulation suggestions are a subset of the one or more query formulation suggestions.

13. The method of claim 11, further comprising transmitting the one or more modified query formulation suggestions for presentation.

14. A system comprising a processor and a memory for identifying query formulation suggestions in response to receiving a portion of a search query, the system comprising:
    a receiving component that receives the portion of the search query;
    a semantic analyzing component that semantically analyzes the portion of the search query to identify one or more query formulation suggestions that comprise semantic-pattern-based query suggestions that are derived from:
  A) semantic query patterns stored in a database, the semantic query patterns being linguistic patterns contained in received queries, and
  B) at least one of one or more entities stored in an entity data store or information associated with the one or more entities,
wherein the semantic analyzing component is configured to:
  C) identify a semantic query pattern that corresponds to the portion of the search query,
  D) identify one or more entities in the entity data store that correspond to the first semantic query pattern, and
  E) generate the one or more query formulation suggestions based on the identified one or more entities that correspond to the first semantic query pattern,
  F) extract specified attribute values by tagging words in the portion of the search query received from a user with their respective attributes; and
a transmitting component that transmits the one or more query formulation suggestions for presentation.

15. The system of claim 14, further comprising an attribute identifying component that identifies attributes that are characteristics of the at least one of the one or more entities.

16. The system of claim 14, wherein identifying the one or more query formulation suggestions occurs simultaneous to formulation of the portion of the search query.

17. One or more computer-storage memory storing computer-useable instructions that, when used by a computing device, cause the computing device to perform a method for identifying query formulation suggestions in response to receiving a portion of a search query, the method comprising:
  receiving the portion of the search query;
  contemporaneous to a formulation of the portion of the search query, identifying one or more query formulation suggestions by:
    A) accessing a database of semantic query patterns that are linguistic patterns contained in received queries,
    B) accessing an entity data store comprising one or more entities, and one or more categories associated with the one or more entities,
    C) using the database of semantic query patterns and the entity data store, identifying the one or more query formulation suggestions based on
      i) a first semantic query pattern,
      ii) at least one of the one or more entities that is determined to be related to the first semantic query pattern,
      iii) one or more categories associated with the at least one of the one or more related entities, and
      iv) extracting specified attribute values by tagging words in the portion of the search query received from a user with their respective attributes;
  transmitting the one or more query formulation suggestions for presentation, wherein the one or more query formulation suggestions are configured to be selectable by the user to formulate the search query;
  receiving a user selection of one of the one or more query formulation suggestions; and
  modifying the portion of the search query according to the selected query formulation suggestion.

18. The one or more computer-storage memory of claim 17, wherein the method further comprises, based on the modified search query, identifying one or more modified query formulation suggestions by semantically analyzing the modified search query.

19. The one or more computer-storage memory of claim 17, wherein the one or more entities are items having known information, and wherein the one or more entities are associated with the one or more categories or one or more attributes, and wherein the one or more query formulation suggestions include one or more of the categories or attributes.

20. A method performed by a computing device having a processor and memory for identifying query formulation suggestions, the method comprising:
  receiving a portion of a search query;
  identifying one or more query formulation suggestions by:
    A) accessing a database of semantic query patterns that are linguistic patterns contained in received queries, wherein a first semantic query pattern corresponding to the portion of the search query is identified,
    B) accessing an entity data store comprising one or more entities, one or more categories associated with the one or more entities, and one or more attributes associated with the one or more entities,
    C) using the database of semantic query patterns and the entity data store, identifying the one or more query formulation suggestions based on
      i) the identified first semantic query pattern,
      ii) an entity of the one or more entities that corresponds to the identified first semantic query pattern, and
      iii) the entity's associated one or more categories and associated one or more attributes, and
      iv) extracting specified attribute values by tagging words in the portion of the search query received from a user with their respective attributes; and
  transmitting the one or more query formulation suggestions for presentation, wherein the one or more query formulation suggestions are configured to be selectable by the user to formulate the search query.

21. The method of claim 20, wherein the semantic query patterns are templates that are stored in the data store.

22. The method of claim 21, wherein the semantic query patterns comprise a static portion and a dynamic portion.

23. The method of claim 22, wherein the dynamic portion is dependent upon the portion of the search query.

24. The method of claim 20, further comprising transmitting the first semantic query pattern as the one or more query formulation suggestions for presentation.

25. The method of claim 20, wherein each of the attributes describes an aspect of one of the one or more entities.

26. The method of claim 20, wherein each of the entity's associated one or more attributes includes an attribute value that is a characteristic of the attribute such that each of the attribute values is associated with the entity.

27. One or more computer-storage memory storing computer-useable instructions that, when used by a computing device, cause the computing device to perform a method for identifying query formulation suggestions, the method comprising:
  receiving a portion of a search query;
  semantically analyzing the portion of the search query by:
    A) accessing a database of semantic query patterns that are linguistic patterns contained in received queries,
    B) accessing an entity data store comprising at least one or more entities, one or more categories related to the one or more entities, one or more attributes related to the one or more entities, and one or more attribute values related to the one or more entities, C) using the database of semantic query patterns and the entity data store, identifying one or more semantic-pattern-based query suggestions based on a first semantic query pattern that corresponds to the portion of the search query, and at least one of the one or more entities that corresponds to the first semantic query pattern, and the one or more corresponding entities' associated categories, attributes, and attribute values, and D) extracting specified attribute values by tagging words in the portion of the search query received from a user with their respective attributes;

transmitting the one or more semantic-pattern-based query suggestions for presentation, the one or more semantic-pattern-based query suggestions being configured to be selectable by the user to formulate the search query;

receiving a user selection of one of the one or more semantic-pattern-based query suggestions;

in response to the user selection, modifying the portion of the search query based on the selected semantic-pattern-based query suggestion; and updating a set of search results based on the modified search query.

28. The one or more computer-storage memory of claim 27, wherein the method further comprises generating the one or more semantic-pattern-based query suggestions.

29. The one or more computer-storage memory of claim 27, wherein the one or more semantic-pattern-based query suggestions matches the at least one of the one or more entities stored in the entity store.

30. The one or more computer-storage memory of claim 27, wherein the method further comprises determining that one of the one or more semantic-pattern-based query suggestions does not match any of the entities in the entity store.

31. The one or more computer-storage memory of claim 30, wherein the method further comprises not transmitting the one of the one or more semantic-pattern-based query suggestions for presentation.

32. The one or more computer-storage memory of claim 27, wherein the first semantic query pattern corresponds to the portion of the search query.

33. The one or more computer-storage memory of claim 27, wherein the attribute values correspond with one or more attributes that are associated with at least one of the one or more entities such that upon receiving a user selection of one of the attributes, the attribute values are transmitted for presentation and are selectable to further refine the portion of the search query.

34. The one or more computer-storage memory of claim 27, wherein the method further comprises:
receiving a selection of one of the attributes;
modifying the portion of the search query based on the selected attribute; and
not displaying the selected attribute as one of the one or more semantic-pattern-based query suggestions based on the portion of the search query already being modified with that selected attribute.

35. One or more computer-storage memory, stored on a computing device, to display a graphical user interface for presenting query formulation suggestions and comprising:

a query display area for displaying a portion of a search query received from a user, wherein the portion of the search query is semantically analyzed to identify one or more semantic-pattern-based query suggestions, wherein the one or more semantic-pattern-based query suggestions includes at least one of one or more entities identified as corresponding to the portion of the search query, one or more attributes, or one or more attribute values, the one or more semantic-pattern-based query suggestions generated by at least one or more semantic query patterns that are linguistic patterns contained in received queries, wherein specified attribute values are extracted by tagging words in the portion of the search query received from the user with their respective attributes;

a first display area comprising an attribute suggestion presenting area for presenting a list of attributes as query formulation suggestions, wherein each attribute in the list of attributes is associated with at least one of the identified one or more entities; and a second display area comprising an attribute value suggestion presenting area for presenting a list of attribute values as the query formulation suggestions upon receiving a user selection of one of the attributes, wherein each attribute value in the list of attribute values is related to the at least one of the one or more entities, and wherein the attribute value suggestion presenting area is arranged relative to the attribute suggestion presenting area such that the attribute values associated with the selected attribute are presented in proximal association with the attributes.

* * * * *